United States Patent
Sugiura

(10) Patent No.: US 9,266,421 B2
(45) Date of Patent: Feb. 23, 2016

(54) COOLING SYSTEM STRUCTURE FOR VEHICULAR WATER-COOLED INTERNAL COMBUSTION ENGINE

(71) Applicant: HONDA MOTOR CO., LTD., Tokyo (JP)

(72) Inventor: Hiroyuki Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 13/752,675

(22) Filed: Jan. 29, 2013

(65) Prior Publication Data

US 2013/0256044 A1    Oct. 3, 2013

(30) Foreign Application Priority Data

Mar. 28, 2012   (JP) .................................. 2012-074928
Mar. 28, 2012   (JP) .................................. 2012-074930

(51) Int. Cl.
    *F01P 3/04*          (2006.01)
    *B60K 11/02*       (2006.01)
    (Continued)

(52) U.S. Cl.
CPC . *B60K 11/02* (2013.01); *F01P 3/04* (2013.01); *F01P 7/16* (2013.01); *F01P 3/02* (2013.01); *F01P 7/14* (2013.01); *F01P 7/165* (2013.01); *F01P 2003/021* (2013.01); *F01P 2003/024* (2013.01); *F01P 2003/027* (2013.01); *F01P 2003/028* (2013.01); *F01P 2050/16* (2013.01); *F02B 75/18* (2013.01); *F02F 1/10* (2013.01); *F02F 1/40* (2013.01); *F02M 61/14* (2013.01)

(58) Field of Classification Search
CPC ................. F01P 7/14; F01P 3/02; F01P 3/04; F01P 2003/021; F01P 1/10; F01P 2003/024; F01P 2003/02; F01P 2003/027; F01P 7/165
See application file for complete search history.

(56) References Cited

U.S. PATENT DOCUMENTS 6,112,706 A *   9/2000   Heer ............................ 123/41.1
6,279,516 B1 *   8/2001   Haugen et al. ......... 123/41.82 R (Continued)

FOREIGN PATENT DOCUMENTS

| JP | 2005-9350 A | 1/2005 |
|---|---|---|
| JP | 2007-278240 A | 10/2007 |
| JP | 4842715 B2 | 12/2011 |

*Primary Examiner* — S. Joseph Morano
*Assistant Examiner* — Hilary L Johns
(74) *Attorney, Agent, or Firm* — Birch, Stewart, Kolasch & Birch, LLP

(57) ABSTRACT

In a cooling system structure for a vehicular water-cooled internal combustion engine with a cylinder section and a cylinder body and a cylinder head. The cooling system structure having water jackets formed in the cylinder body and the cylinder head, respectively, with a radiator disposed forwardly of the engine main unit. A water pump performs forced circulation of coolant through the radiator and the water jackets, to permit routing of pipes with enhanced appearance. Water jackets are formed, respectively, in a cylinder body and a cylinder head such that coolant flows through the cylinder body and the cylinder head independently of each other. A thermostat is mounted on a front wall surface of a cylinder section and is capable of selecting a condition in which the water jackets directly communicate with each other or a condition in which the water jackets communicate with each other via a radiator.

20 Claims, 15 Drawing Sheets

(51) Int. Cl.
*F01P 3/02* (2006.01)
*F02B 75/18* (2006.01)
*F02F 1/40* (2006.01)
*F02M 61/14* (2006.01)
*F01P 7/14* (2006.01)
*F01P 7/16* (2006.01)
*F02F 1/10* (2006.01)

(56) References Cited

U.S. PATENT DOCUMENTS

2004/0060524 A1\* 4/2004 Hwang et al. ............... 123/41.28
2008/0023291 A1\* 1/2008 Sorani et al. ................. 192/87.1
2011/0265742 A1\* 11/2011 Choi et al. .................. 123/41.09

\* cited by examiner

COOLING SYSTEM STRUCTURE FOR VEHICULAR WATER-COOLED INTERNAL COMBUSTION ENGINE

CROSS-REFERENCE TO RELATED APPLICATIONS

The present application claims priority under 35 USC 119 to Japanese Patent Application No. 2012-074928 filed Mar. 28, 2012 and Japanese Patent Application No. 2012-074930 filed Mar. 28, 2012 the entire contents of which are hereby incorporated by reference.

BACKGROUND OF THE INVENTION

1. Field of the Invention

The present invention relates to a cooling system structure for a vehicular water-cooled internal combustion engine. The internal combustion engine includes a cylinder section constituting, together with a crankcase for rotatably supporting a crankshaft, an engine main unit, with a cylinder body that rises upwardly from the crankcase. A piston is connected to the crankshaft and is slidably fitted within a cylinder head connected to the cylinder body. Water jackets are formed in the cylinder body and the cylinder head, respectively. A radiator is disposed forwardly of the engine main unit with a water pump disposed on the engine main unit. The water pump performs a forced circulation of coolant through the radiator and the water jackets.

The present invention also relates generally to power units for small sized vehicles. The power unit is mounted on a vehicle body frame including an internal combustion engine and a transmission. The internal combustion engine includes a crankcase that rotatably supports a crankshaft having an axis extending in a vehicle width direction and a cylinder body in which a piston connected to the crankshaft is slidably fitted and that rises upwardly from a front portion of the crankcase. The cylinder body includes a water jacket formed therein for circulating coolant. The transmission is disposed rearwardly of the crankshaft and is housed in a transmission housing section formed in the crankcase rearwardly of the cylinder body. The present invention relates particularly to an improved cooling system structure in a power unit for use in a small sized vehicle.

2. Description of Background Art

A known arrangement, as disclosed in Japanese Patent No. 4842715 wherein a cooling system structure includes a water pump disposed at a lower portion on a first end side of an engine main unit in a direction extending along an axis of a crankshaft. A thermostat is disposed at a front portion of a cylinder head on a side opposite to the water pump in the direction extending along the axis of the crankshaft. The arrangement further makes a discharge port of the water pump communicating directly with a front lower portion of a water jacket formed in a cylinder body, thereby allowing coolant to flow to the side of the thermostat by way of the water jacket in the cylinder body and a water jacket in the cylinder head.

A radiator needs to be disposed at a position wherein the radiator easily receives airflow forwardly of an engine main unit. In the arrangement disclosed in Japanese Patent No. 4842715, external pipes disposed on both side of the engine main unit connect between the thermostat and the radiator, and between the radiator and the water pump. A need thus exists for improvements in terms of appearance.

Japanese Patent Laid-Open No. 2005-9350 discloses a disposition of a water pump in a power unit mounted on a small sized vehicle, such as a motorcycle. More specifically, the water pump is disposed on a side wall of a cylinder body wherein the positioning is less likely to be subject to restrictions in terms of layout and an extending of the piping length is avoided.

In a small sized vehicle, such as a motorcycle, in which the position at which the power unit is mounted greatly affects an interior space of an occupant, a need exists for minimizing the size of the power unit in a vehicle width direction as much as possible. However, in Japanese Patent Laid-Open No. 2005-9350 the water pump that is operatively associated and connected with a first end of a crankshaft is disposed so as to bulge outwardly in the vehicle width direction from the side wall of the cylinder body. This invites a larger size of the power unit in the vehicle width direction and a longer piping length between a water jacket in the cylinder body and the water pump.

SUMMARY AND OBJECTS OF THE INVENTION

The present invention has been made in view of the foregoing situation and it is an object of an embodiment of the present invention to provide a cooling system structure for a vehicular water-cooled internal combustion engine that permits routing of pipes with an enhanced appearance.

To achieve the foregoing object, a first feature of an embodiment of the present invention provides a cooling system structure for a vehicular water-cooled internal combustion engine, wherein a cylinder section constitutes, together with a crankcase for rotatably supporting a crankshaft, an engine main unit with a cylinder body that rises upwardly from the crankcase. A piston is connected to the crankshaft and is slidably fitted within a cylinder head connected to the cylinder body. Water jackets are formed in the cylinder body and the cylinder head, respectively. A radiator is disposed forwardly of the engine main unit with a water pump disposed on the engine main unit. The water pump performs a forced circulation of coolant through the radiator and the water jackets. The cooling system structure for a vehicular water-cooled internal combustion engine includes water jackets respectively formed so as to allow coolant to flow through the cylinder body and the cylinder head independently of each other. A thermostat is disposed on a front wall surface of the cylinder section wherein the thermostat is capable of selecting a condition in which the water jacket in the cylinder body and the water jacket in the cylinder head directly communicate with each other or a condition wherein the water jacket in the cylinder body and the water jacket in the cylinder head communicate with each other via the radiator.

According to an embodiment of the present invention, the water pump is disposed rearwardly of the cylinder section so as to sandwich the cylinder section between the water pump and the radiator in a longitudinal direction. In addition, the water pump has a discharge port connected to one of the water jacket in the cylinder body and the water jacket in the cylinder head and a suction port connected to the other of the water jacket in the cylinder body and the water jacket in the cylinder head.

According to an embodiment of the present invention, the cooling system structure includes connecting paths formed at a front portion of one of the cylinder body and the cylinder head, respectively. The connecting path communicating with the water jacket in the other of the cylinder body and the cylinder head, and the connecting path communicating with the water jacket in the one of the cylinder body and the cylinder head. The thermostat is disposed on the front wall surface of the one of the cylinder body and the cylinder head so as to select a condition in which the connecting paths are in communication with each other or a condition in which the connecting paths are in communication with each other via the radiator.

According to an embodiment of the present invention, the cooling system structure including the connecting paths are formed to be open in the front wall surface of the cylinder body so as to be adjacent to each other. In addition, a thermostat case is disposed on the front wall surface of the cylinder body so as to cover open ends of the connecting paths. The thermostat is housed within the thermostat case housing.

According to an embodiment of the present invention, the thermostat is disposed at a central portion of the cylinder section in a direction extending along an axis of the crankshaft.

According to an embodiment of the present invention, the thermostat case that houses the thermostat includes an extracting pipe section for extracting coolant to a side of the radiator and an introducing pipe section for introducing coolant returned from the radiator. The extracting pipe section and the introducing pipe section being disposed so as to protrude in directions opposite to each other in a vehicle width direction.

According to an embodiment of the present invention, the thermostat has an operating axis direction set to extend in a direction of a cylinder axis of the cylinder section. In addition, the operating axis direction of the thermostat is set to extend in a direction of the axis of the crankshaft.

According to an embodiment of the present invention, the water jackets are formed in the cylinder body and the cylinder head, respectively, such that coolant flows through the cylinder body and the cylinder head independently of each other. The thermostat is mounted on the front wall surface of the cylinder section, the thermostat being capable of selecting a condition in which the water jacket in the cylinder body and the water jacket in the cylinder head directly communicate with each other or a condition in which the water jacket in the cylinder body and the water jacket in the cylinder head communicate with each other via the radiator. Piping connecting the thermostat and the radiator can therefore be routed on a side adjacent the center in the vehicle width direction in a space between the cylinder section and the radiator disposed forwardly of the cylinder section, which improves the appearance.

According to an embodiment of the present invention, the water pump is disposed rearwardly of the cylinder section so as to sandwich the cylinder section between the water pump and the radiator in the longitudinal direction has the discharge port connected to the water jacket in one of the cylinder body and the cylinder head and the suction port connected to the water jacket in the other of the cylinder body and the cylinder head. The foregoing arrangements allow the water pump to be disposed as close as possible to the water jackets to thereby achieve a shorter piping length.

According to an embodiment of the present invention, the connecting path is disposed at the front portion of one of the cylinder body and the cylinder head, the connecting path communicating with the water jacket in the other of the cylinder body and the cylinder head and the connecting path disposed at the front portion of the one of the cylinder body and the cylinder head, the connecting path communicating with the water jacket in the one of the cylinder body and the cylinder head. The thermostat is mounted on the front wall surface of the one of the cylinder body and the cylinder head so as to select a condition in which the connecting paths are in communication with each other or a condition in which the connecting paths are in communication with each other via the radiator. This simplifies a path structure, while shortening a path length between the water jackets and the thermostat.

According to an embodiment of the present invention, the connecting paths are formed to be open in the front wall surface of the cylinder body so as to be adjacent to each other. The thermostat case is mounted on the front wall surface of the cylinder body so as to cover the open ends of the connecting paths. This simplifies a connecting structure between the thermostat and the connecting paths.

According to an embodiment of the present invention, the thermostat is disposed at a central portion of the cylinder section in a direction extending along the axis of the crankshaft. This makes the length of a line that extracts coolant from the thermostat to the radiator equal to that of a line that returns the coolant from the radiator to the thermostat and keeps these lengths short.

According to an embodiment of the present invention, the extracting pipe section for extracting coolant to the side of the radiator and the introducing pipe section for introducing coolant returned from the radiator are disposed in the thermostat case so as to protrude in directions opposite to each other in the vehicle width direction. This allows lines extending from the thermostat case to be connected to connecting ports on both sides in the vehicle width direction of the radiator over a shortest possible distance.

According town embodiment of the present invention, the operating axis direction of the thermostat is set to extend in the direction of the cylinder axis. This shortens the length of the thermostat in the vehicle width direction, prevents the thermostat from protruding sideways from the engine main unit in an internal combustion engine having a small number of cylinders, and prevents the internal combustion engine from becoming wide in the vehicle width direction.

According to an embodiment of the present invention, the thermostat disposed on the front wall surface of the cylinder body has an operating axis direction that extends in the direction of the axis of the crankshaft. This shortens a vertical length of the thermostat, so that interference between the thermostat and the cylinder head can be easily avoided.

The present invention has been made in view of the foregoing situation and it is an object of an embodiment of the present invention to provide a cooling system structure in a power unit for use in a small sized vehicle that achieves a compact power unit including a water pump in a vehicle width direction and a shorter piping length between a water jacket in a cylinder body and the water pump.

According to an embodiment of the present invention, a cooling system structure in a power unit for use in a small sized vehicle is provided wherein the power unit is disposed on a vehicle body frame and includes an internal combustion engine that includes a crankcase that rotatably supports a crankshaft having an axis extending in a vehicle width direction. A cylinder body is provided in which a piston connected to the crankshaft is slidably fitted and that rises upwardly from a front portion of the crankcase. The cylinder body includes a water jacket formed therein for circulating coolant. A transmission is disposed rearwardly of the crankshaft and is housed in a transmission housing section formed in the crankcase rearwardly of the cylinder body, wherein a water pump is disposed rearwardly of the cylinder body and upwardly of the transmission housing section. The water pump circulates the coolant through the water jacket in the cylinder body.

According to an embodiment of the present invention, the transmission housing section has a recessed portion indented downwardly and formed in an upper surface thereof. Part of the water pump is disposed in the recessed portion.

According to an embodiment of the present invention, the transmission includes a transmission shaft rotatably supported by the crankcase such that power is transmitted from the crankshaft. A power transmission mechanism is disposed between the transmission shaft and a pump shaft of the water pump.

According to an embodiment of the present invention, a pump housing included in the water pump is disposed on the cylinder body such that a discharge port disposed in the pump housing communicates with an inflow port disposed in the cylinder body so as to be in communication with the water jacket.

According to an embodiment of the present invention, a rigid conduit connecting the discharge port and the inflow port has a first end portion fitted in one of the pump housing and the cylinder body fluid-tightly via a first annular sealing member and a second end portion fastened to the other of the pump housing and the cylinder body fluid-tightly via a second annular sealing member.

According to an embodiment of the present invention, a cylinder head having a cylinder head side water jacket that joins to the water jacket in the cylinder body is connected to an upper end portion of the cylinder body. A thermostat case of a thermostat communicating with the cylinder head side water jacket is connected to the cylinder head, and the water pump is disposed immediately beneath the thermostat case. According to an embodiment of the present invention, the thermostat case is integrally formed with the pump housing of the water pump.

According to an embodiment of the present invention, a radiator is disposed forwardly of the cylinder body so as to sandwich the cylinder body between the radiator and the water pump.

It is noted that a main shaft 49 in the preferred embodiment of the present invention corresponds to the transmission shaft of the present invention.

According to an embodiment of the present invention, the water pump is disposed rearwardly of the cylinder body and upwardly of the transmission housing section formed in the crankcase. The water pump is thereby disposed close to the water jacket in the cylinder body, so that a piping length between the water jacket in the cylinder body and the water pump can be shortened. In addition, the water pump, being disposed rearwardly of the cylinder body, does not protrude sideways from the cylinder body in the vehicle width direction. A distance from the crankshaft that develops power for driving the water pump can also be shortened to thereby achieve a compact power unit.

According to an embodiment of the present invention, part of the water pump is disposed in the recessed portion disposed in the upper surface of the transmission housing section formed in the crankcase. The water pump is thus disposed at a low level, so that reduction in size and a lower center of gravity of the power unit can be achieved.

According to an embodiment of the present invention, the transmission shaft included in the transmission disposed rearwardly of the crankshaft is connected to the pump shaft of the water jacket disposed upwardly of the transmission housing section via the power transmission mechanism. The power transmission mechanism can therefore be built compactly such that power is transmitted to the pump shaft from the transmission shaft disposed closer to the water pump relative to the crankshaft.

According to an embodiment of the present invention, the pump housing of the water pump is mounted on the cylinder body. Mounting stiffness of the water pump can thereby be enhanced.

According to an embodiment of the present invention, the rigid conduit connecting the discharge port and the inflow port has a first end portion fitted in one of the pump housing and the cylinder body fluid-tightly and a second end portion fastened to the other of the pump housing and the cylinder body fluid-tightly. The pump housing can thus be connected to the cylinder body in a fluid-tight condition, while permitting deviation in positions occurring during assembly due to variations in forming accuracy.

According to an embodiment of the present invention, the thermostat case of the thermostat communicating with the cylinder head side water jacket is connected to the cylinder head that is connected to the upper end portion of the cylinder body and the water pump is disposed immediately beneath the thermostat case. A dead space otherwise created downwardly of the thermostat when the thermostat is disposed can be effectively used for disposing the water pump, which contributes to reduction in size of the power unit.

According to an embodiment of the present invention, the thermostat case and the pump housing are integrally formed with each other. This prevents the number of parts from increasing as a result of disposing the thermostat.

According to an embodiment of the present invention, disposing the radiator and the water pump across the cylinder body in the longitudinal direction allows the radiator and the water pump to be disposed compactly close to the cylinder body, while avoiding interference among the radiator, the cylinder body, and the water pump.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Specific embodiments to which the present invention is applied will be described below with reference to the accompanying drawings. Throughout the descriptions given hereunder, vertical and crosswise directions are relative to a rider operating a motorcycle.

Figure 1:
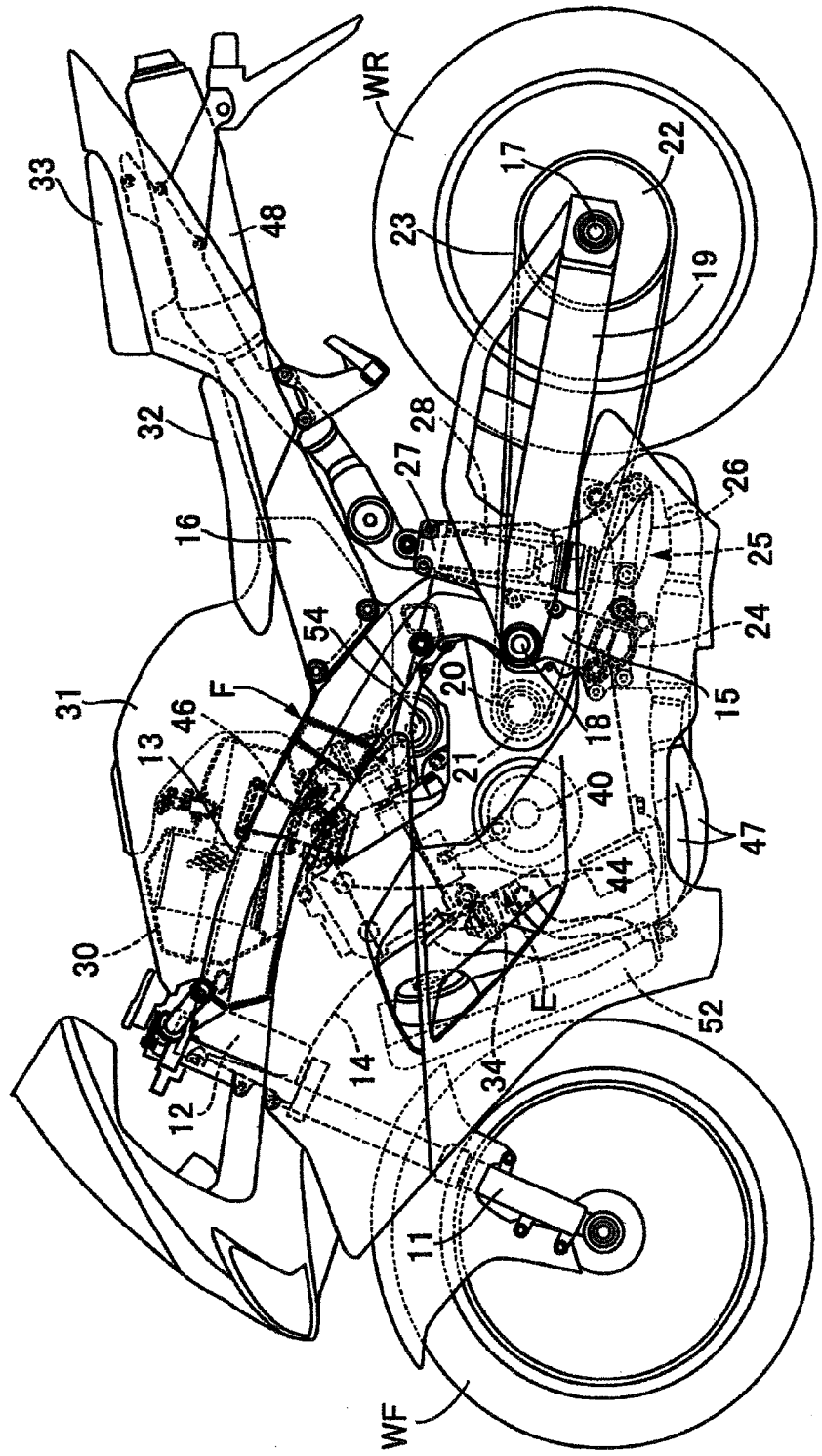
FIG. 1 is a left side elevational view showing a motorcycle according to a first embodiment of the present invention.

A cooling system structure according to a first embodiment of the present invention will be described below with reference to FIGS. 1 to 7. Referring to FIG. 1, a motorcycle as a vehicle includes a vehicle body frame F. The vehicle body frame F includes a head pipe 12, a pair of left and right main frames 13, a pair of left and right engine hangers 14, a pair of left and right pivot frames 15, and a pair of left and right seat rails 16. More specifically, the head pipe 12 steerably and removably supports a front fork 11 that journals a front wheel WF. The main frames 13 extend downwardly toward the rear from the head pipe 12. The engine hangers 14 are connected to the head pipe 12 and front portions of the main frames 13 and extend downwardly toward the rear under the main frames 13. The pivot frames 15 are connected to rear end portions of the main frames 13 and extend downwardly. The seat rails 16 extend upwardly toward the rear and are connected to rear portions of the main frames 13.

An engine main unit 34 of a water-cooled, four-cylinder internal combustion engine E is mounted on the vehicle body frame F so as to be disposed downwardly of the main frames 13. An axle 17 of a rear wheel WR that is rotatably driven by power output from the internal combustion engine E is journaled by a rear end portion of a swing arm 19 that has a front end portion vertically swingably supported on the pivot frames 15 via a pivot 18. In addition, a gear transmission M (see FIG. 4) is built into the engine main unit 34. An endless chain 23 is wound around a drive sprocket 21 fixed to an output shaft 20 of the gear transmission M and a driven sprocket 22 fixed to the axle 17.

A linkage mechanism 25 is disposed between a cross pipe 24 that connects lower portions of the pivot frames 15 and the swing arm 19. A rear shock absorber unit 28 is disposed between a linkage member 26 that forms part of the linkage mechanism 25 and a bracket 27 disposed at a front portion of the swing arm 19.

An air cleaner 30 is disposed upwardly of the engine main unit 34 so as to be positioned rearwardly of the head pipe 12 in the vehicle body frame F. A fuel tank 31 that covers a rear portion and an upper portion of the air cleaner 30 is mounted on the main frames 13 in the vehicle body frame F. A main seat 32 on which a rider sits is supported on the seat rails 16 at a position rearward of the fuel tank 31. A pillion seat 33 on which a passenger sits is supported on the seat rails 16 at a position away rearwardly from the main seat 32.

Figure 2:
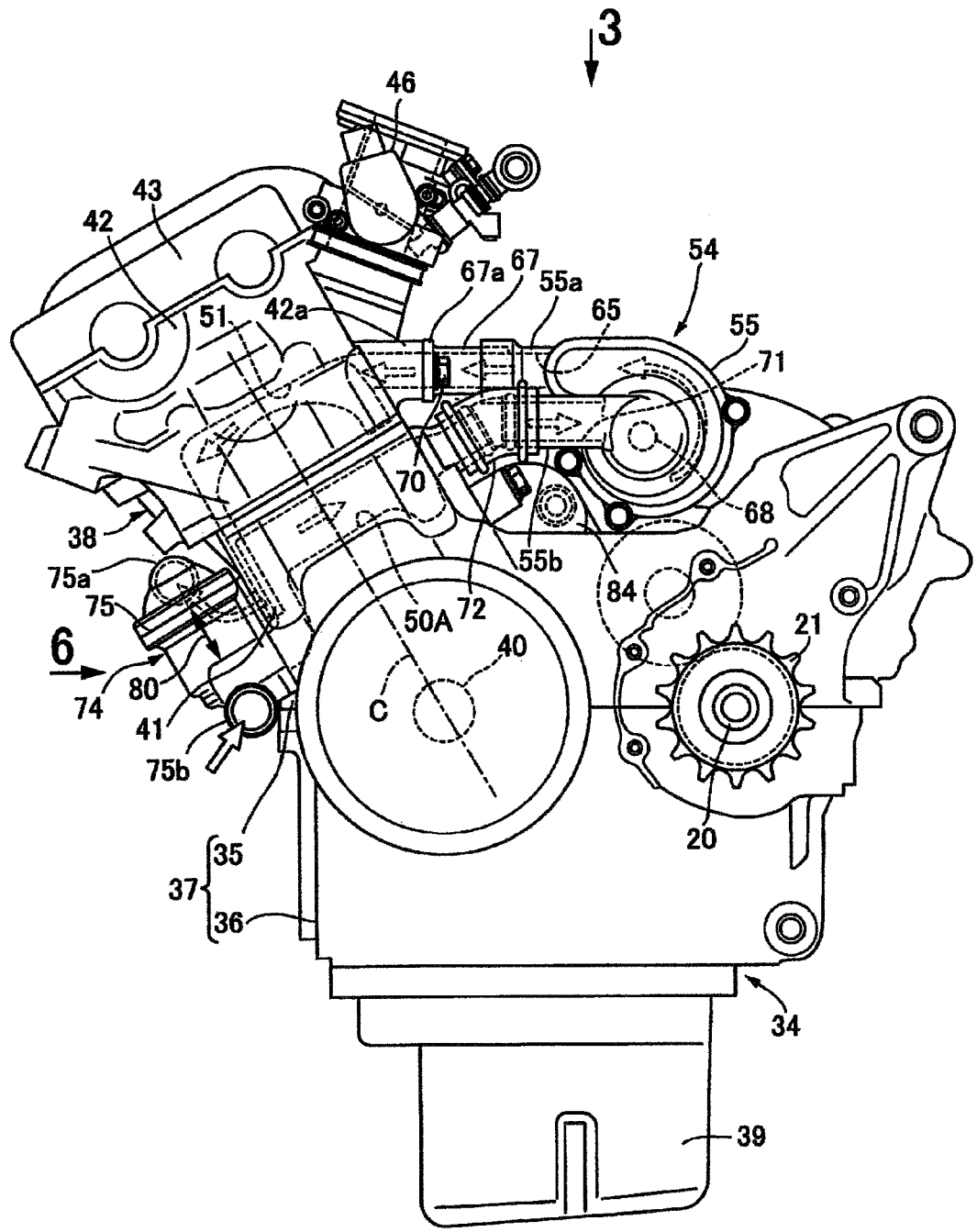
FIG. 2 is a left side elevational view showing an engine main unit.
Figure 3:
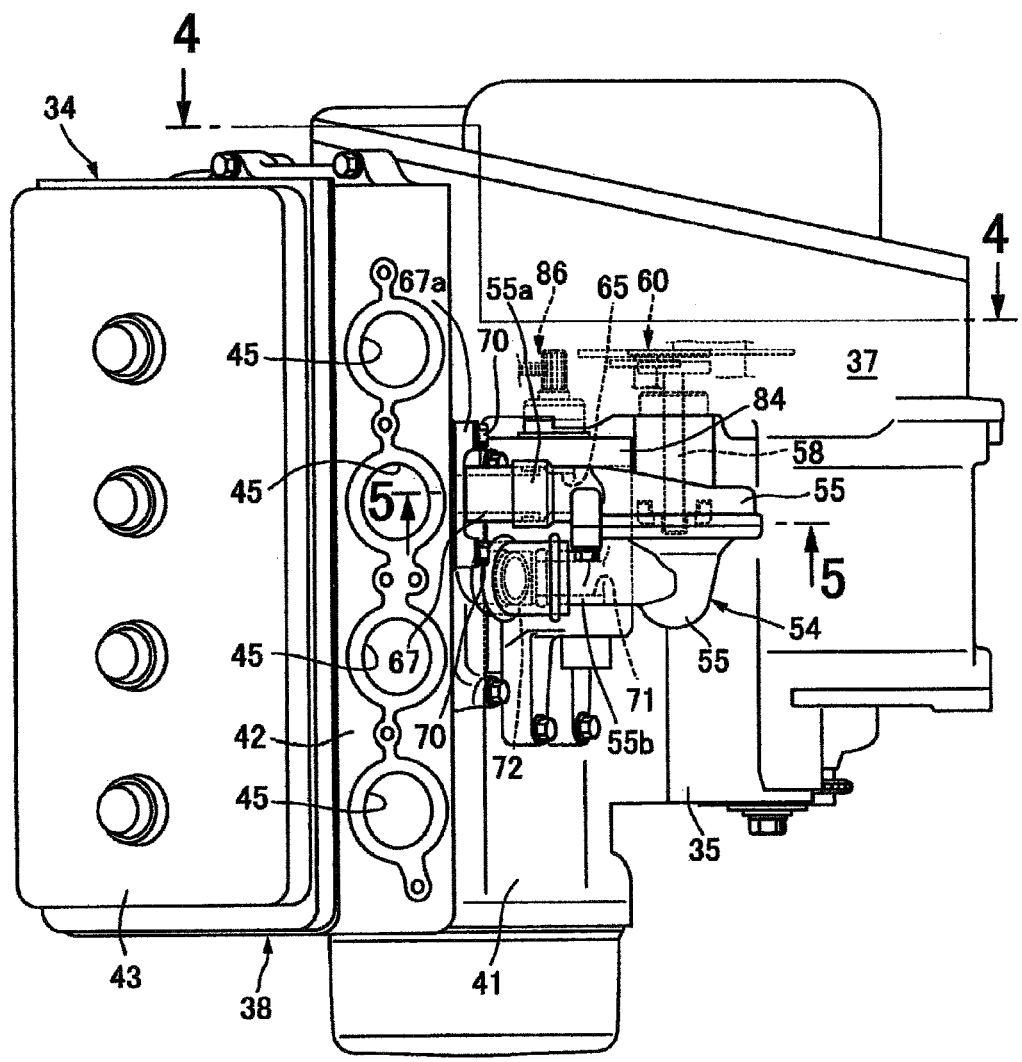
FIG. 3 is a view on arrow 3 in FIG. 2.
Figure 4:
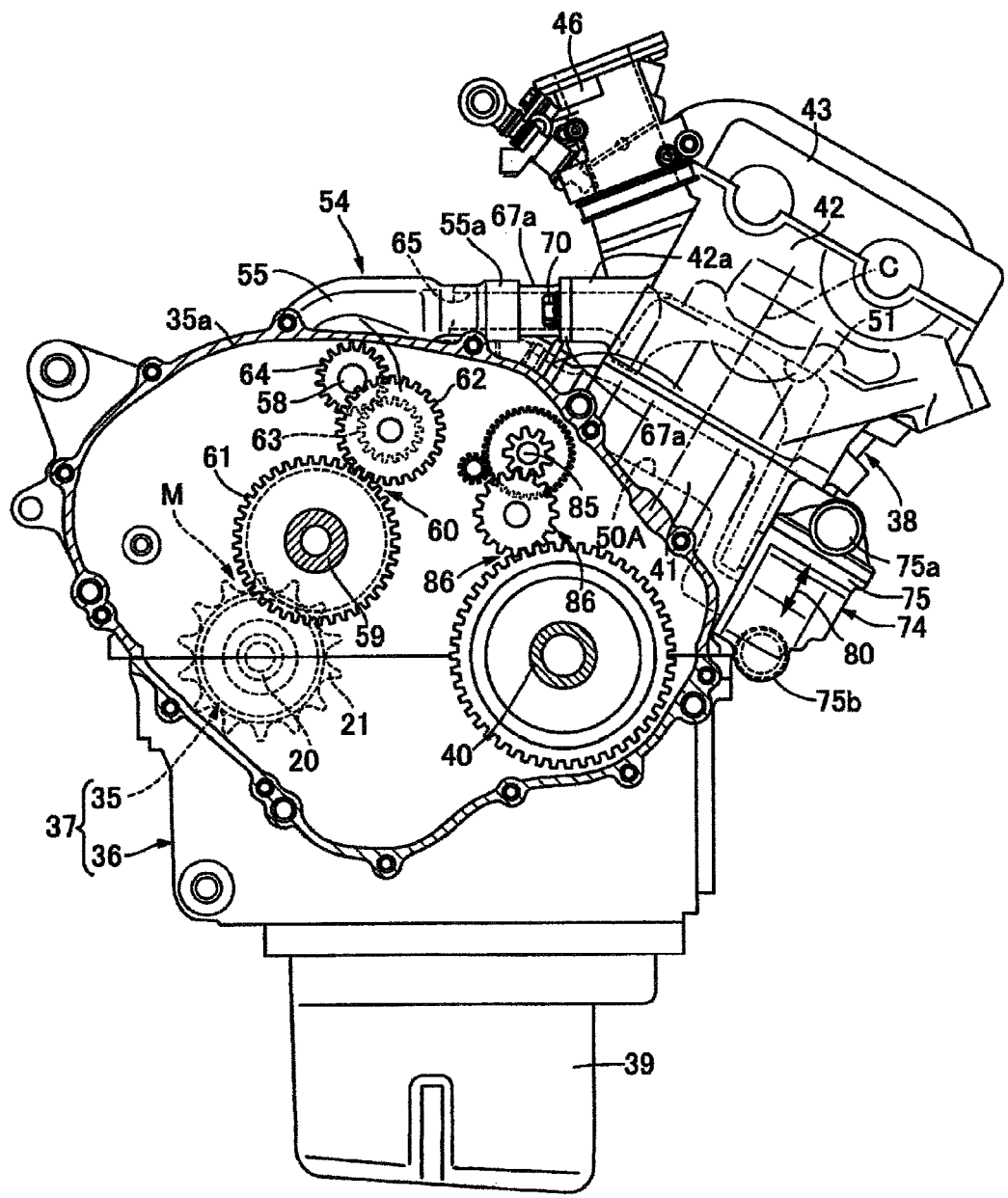
FIG. 4 is a cross-sectional view taken along line 4-4 of FIG. 3.

Referring also to FIGS. 2 to 4, the engine main unit 34 includes a crankcase 37 and a cylinder section 38. More specifically, the crankcase 37 includes an upper portion case half body 35 and a lower portion case half body 36 mutually connected together. The crankcase 37 also rotatably and removably supports a crankshaft 40 that has an axis extending in a vehicle width direction. The cylinder section 38 rises upwardly from a front portion of the crankcase 37 in a position inclined upwardly toward the front. An oil pan 39 is connected to a lower portion of the crankcase 37.

The cylinder section 38 includes a cylinder body 41, a cylinder head 42, and a head cover 43. More specifically, the cylinder body 41 is integrated with the upper portion case half body 35 so as to rise upwardly from the front portion of the crankcase 37 in a position obliquely inclined to the front. The cylinder head 42 is connected to an upper end portion of the cylinder body 41. The head cover 43 is connected to the cylinder head 42.

The cylinder body 41 includes pistons 44 (see FIG. 1) that are slidably fitted in respective cylinders juxtaposed in the vehicle width direction, each of the pistons 44 being commonly connected to the crankshaft 40.

An intake port 45 (see FIG. 3) for each of the cylinders is open in a rear portion side surface of the cylinder head 42. Each of the intake ports 45 is connected to the air cleaner 30 via a throttle body 46 of each of the cylinders. An exhaust pipe 47 of each cylinder has an upstream end connected to a front wall surface of the cylinder head 42 and a downstream end connected to an exhaust muffler 48 disposed upwardly of the rear wheel WR.

Water jackets 50A and 51 are formed in the cylinder body 41 and head 42, respectively, to thereby allow coolant to flow therethrough independently of each other. A radiator 52 is disposed forwardly of the engine main unit 34 as shown in FIG. 1. A water pump 54 is disposed rearwardly of the cylinder section 38 so as to sandwich the cylinder section 38 between the water pump 54 and the radiator 52 longitudinally. The water pump 54 forcedly circulates the coolant through the radiator 52 and the water jackets 50A and 51.

Figure 5:
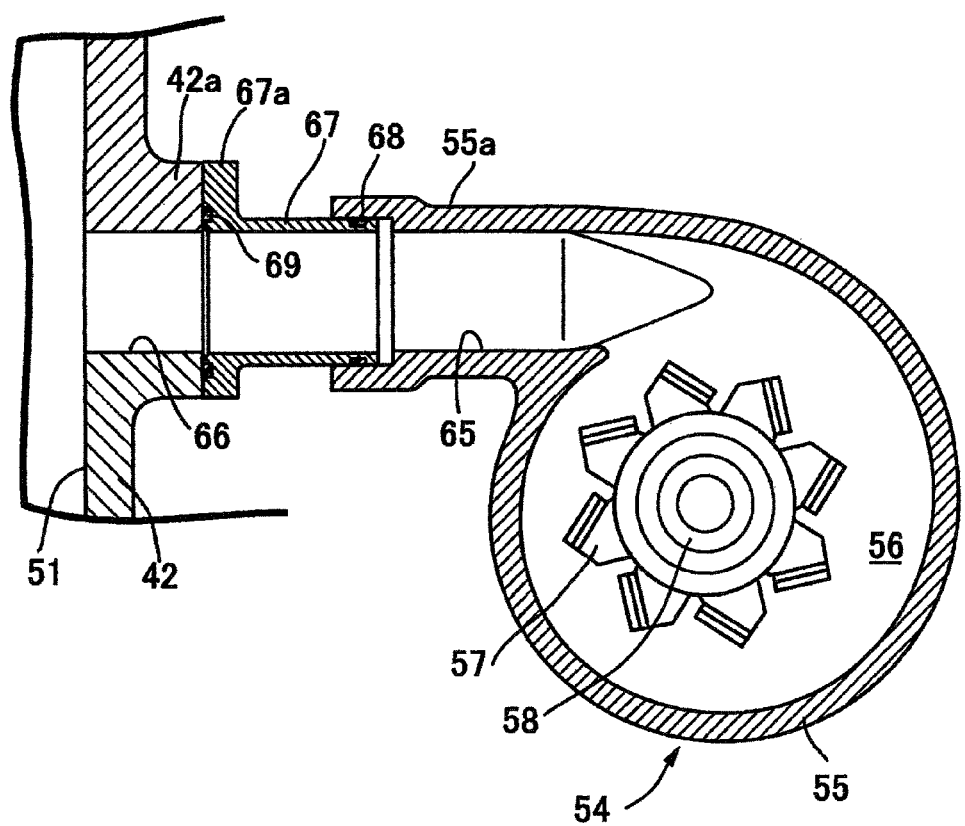
FIG. 5 is a cross-sectional view taken along line 5-5 of FIG. 3.

Referring to FIG. 5, the water pump 54 includes an impeller 57 housed in a pump chamber 56 defined inside a pump housing 55. The impeller 57 is disposed on a pump shaft 58 that is rotatably supported by the pump housing 55. The pump housing 55 is supported by the upper portion case half body 35 in the crankcase 37 at a position rearward of the cylinder section 38.

As explicitly shown in FIG. 4, the gear transmission M includes a main shaft 59 and a gear train. More specifically, the main shaft 59 is rotatably supported by the crankcase 37 so as to receive rotational power transmitted from the crankshaft 40. The gear train is capable of selectively establishing a plurality of shift speeds with the output shaft 20 that assumes a countershaft rotatably supported by the crankcase 37. A power transmission mechanism 60 is disposed between the main shaft 59 and the pump shaft 58 of the water pump 54. The power transmission mechanism 60 includes a drive gear 61, a first intermediate gear 62, a second intermediate gear 63, and a driven gear 64. More specifically, the drive gear 61 is fixed to the main shaft 59. The first intermediate gear 62 meshes with the drive gear 61. The second intermediate gear 63 rotates integrally with the first intermediate gear 62. The driven gear 64 is fixed to the pump shaft 58 and meshes with the second intermediate gear 63.

The pump housing 55 of the water pump 54 includes a discharge pipe section 55a and a suction pipe section 55b. More specifically, the discharge pipe section 55a forms a discharge port 65 for discharging coolant from the pump chamber 56. The suction pipe section 55b forms a suction port 71 for drawing coolant into the pump chamber 56. The discharge port 65 is connected to one of the water jacket 50A in the cylinder body 41 and the water jacket 51 in the cylinder head 42. The suction port 71 is connected to the other of the water jacket 50A in the cylinder body 41 and the water jacket 51 in the cylinder head 42. In the first embodiment of the present invention, the discharge port 65 is connected to the water jacket 51 in the cylinder head 42 and the suction port 71 is connected to the water jacket 50A in the cylinder body 41.

Referring again to FIG. 5, the discharge pipe section 55a that forms the discharge port 65 is integrated with the pump housing 55 so as to protrude toward a rear wall of the cylinder head 55. Meanwhile, the cylinder head 42 includes a connecting portion 42a integrally formed on the rear portion side surface thereof. The connecting portion 42a protrudes toward the side of the water pump 54 and forms an inflow port 66 that communicates with the water jacket 51 in the cylinder head 42. The discharge pipe section 55a is connected to the connecting portion 42a via a connecting pipe 67.

The connecting pipe 67 has an annular sealing member 68 fitted fluid-tightly in the discharge pipe section 55a at a first end portion thereof. The connecting pipe 67 has a flange portion 67a disposed at a second end portion thereof. The flange portion 67a is fastened to the connecting portion 42a with a pair of bolts 70, 70 via an annular sealing member 69 interposed between the flange portion 67a and the connecting portion 42a.

The suction pipe section 55b that forms the suction port 71 is integrated with the pump housing 55 so as to protrude toward a rear wall of the cylinder body 41. The suction pipe section 55b is connected to the rear wall of the cylinder body 41 via a connecting pipe 72 so as to communicate with the suction port 71 in the water jacket 50A in the cylinder body 41.

Figure 6:
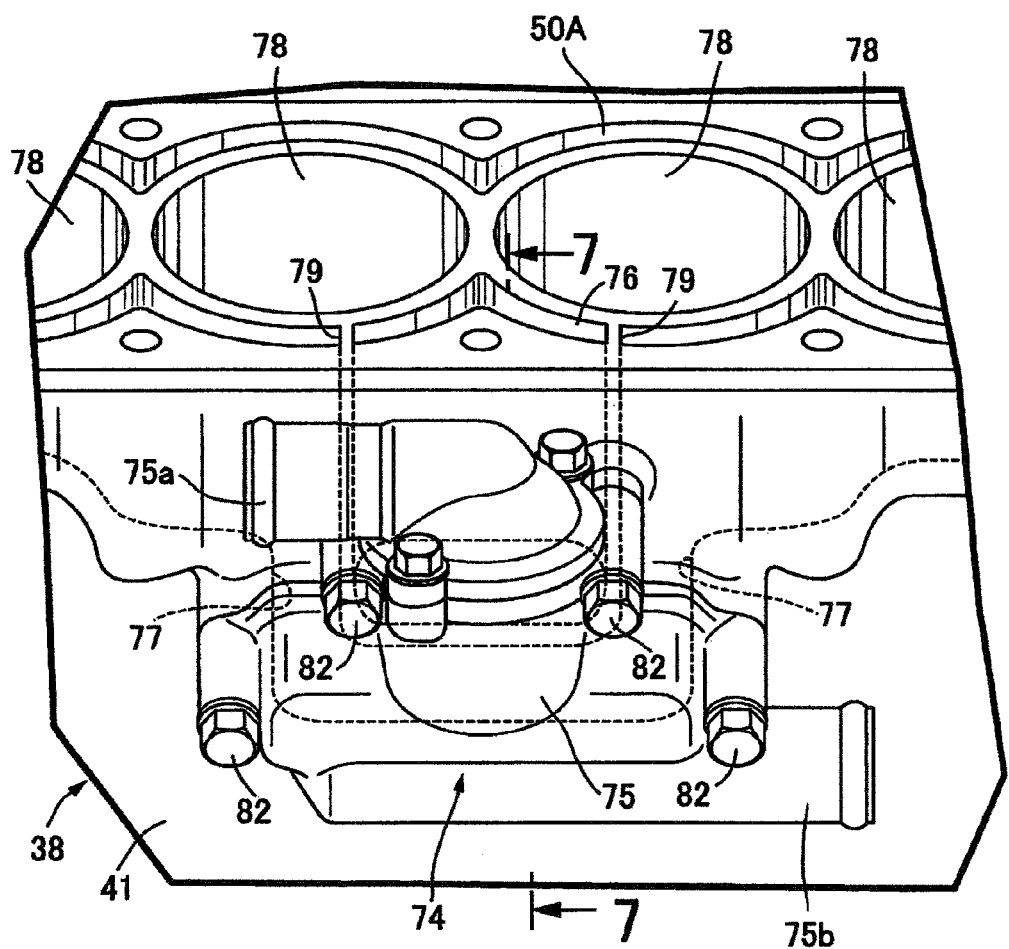
FIG. 6 is a view on arrow 6 of FIG. 2.
Figure 7:
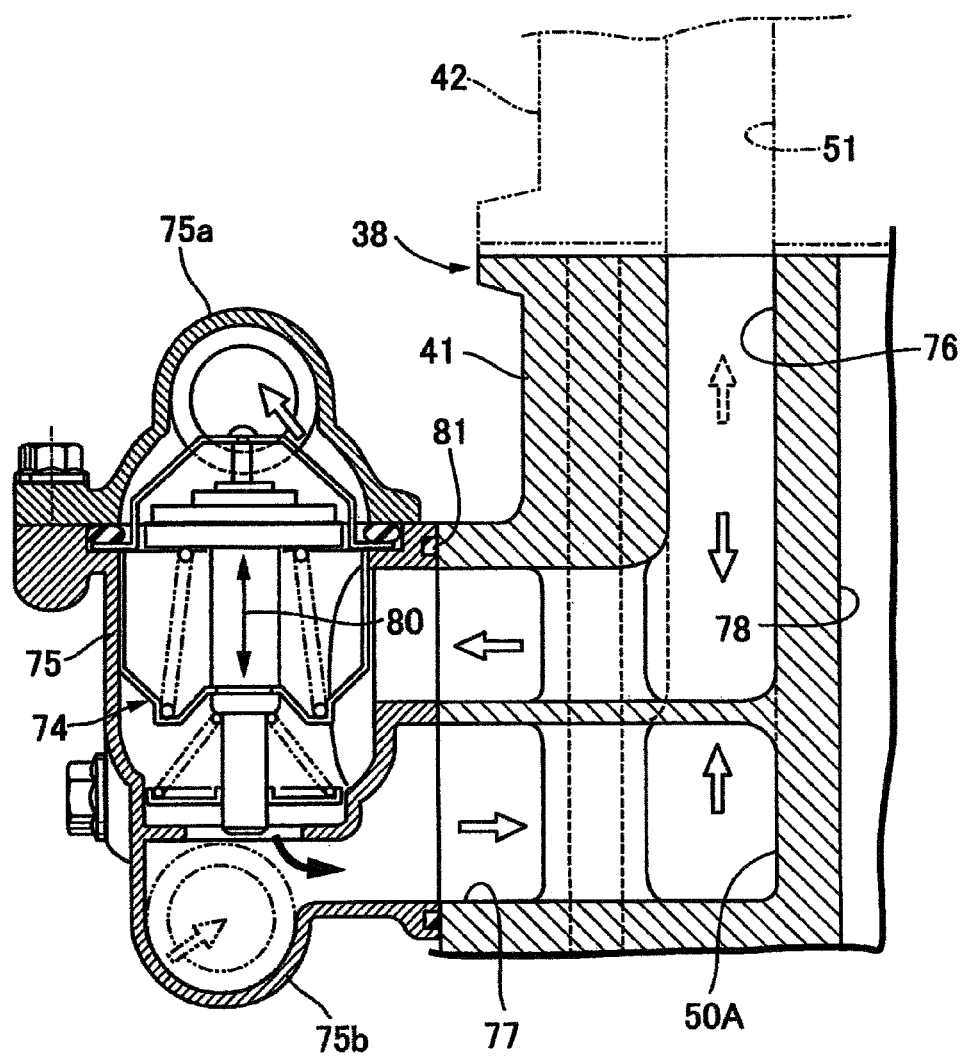
FIG. 7 is a cross-sectional view taken along line 7-7 of FIG. 6.

Referring also to FIGS. 6 and 7, a thermostat 74 is mounted on a front wall surface at a central portion of the cylinder section 38 in a direction extending along the axis of the crankshaft 40 (in the vehicle width direction). The thermostat 74 can select a condition in which the water jacket 50A in the cylinder body 41 and the water jacket 51 in the cylinder head 42 directly communicate with each other or a condition in which the water jacket 50A in the cylinder body 41 and the water jacket 51 in the cylinder head 42 communicate with each other via the radiator 52.

A connecting path 76 and connecting paths 77, 77 are formed in a front portion of one of the cylinder body 41 and the cylinder head 42, specifically according to the first embodiment of the present invention, the cylinder body 41. The connecting path 76, and the connecting paths 77, 77 communicate with the other of the cylinder body 41 and the cylinder head 42, specifically according to the first embodiment of the present invention, the water jacket 51 in the cylinder head 42 and the water jacket 50A in the cylinder body 41, respectively. The thermostat 74 is mounted on the front wall surface of the cylinder body 41 so as to select a condition in which the connecting paths 76 and 77, 77 are in communication with each other or a condition in which the connecting paths 76 and 77, 77 are in communication with each other via the radiator 52.

The water jacket 50A in the cylinder body 41 is formed so as to surround four cylinder bores 78, 78 for allowing the pistons 44 to slide thereover, the cylinder bores 78, 78 being arranged in juxtaposition in the cylinder body 41. The water jacket 50A is not, however, formed in the front portion of the cylinder body 41 at a central portion in a direction in which the cylinder bores 78, 78 are arranged. The connecting path 76 formed in the cylinder body 41 to communicate with the water jacket 51 in the cylinder head 42 extends vertically with thin bulkheads 79, 79 interposed between the water jacket 50A and the connecting path 76 at the portion at which the water jacket 50A is not formed. The connecting path 76 thus functions as a water jacket for cooling part of the cylinder body 41.

The connecting paths 77, 77 communicating with the water jacket 50A are open in the front wall surface of the cylinder body 41 so as to communicate with a lower portion of the water jacket 50A on the outside of the bulkheads 79, 79. The connecting path 76 formed in the cylinder body 41 to communicate with the water jacket 51 in the cylinder head 42 is also open in the front wall surface of the cylinder body 41 at a position adjacent to the connecting paths 77, 77.

The thermostat 74 is housed in a thermostat case 75 such that an operating axis direction 80 thereof extends in a direction of a cylinder axis C (see FIGS. 2 and 4) of the cylinder section 38. The thermostat case 75 is fastened to the front wall surface of the cylinder body 41 with a plurality of bolts 82, 82 so as to cover open ends of the connecting paths 76 and 77, 77. A sealing member 81 is inserted between the thermostat case 75 and the cylinder body 41.

The thermostat case 75 includes an extracting pipe section 75a and an introducing pipe section 75b. The extracting pipe section 75a extracts coolant to the side of the radiator 52. The introducing pipe section 75b introduces coolant returned from the radiator 52. The extracting pipe section 75a and the introducing pipe section 75b are disposed so as to protrude in directions opposite to each other in the vehicle width direction.

A starter motor 84 is disposed downwardly of the water pump 54 on an upper wall of the upper portion case half body 35 in the crankcase 37 rearward of the cylinder section 38. The starter motor 84 is disposed such that a motor shaft 85 thereof extends in parallel with the crankshaft 40. A gear type power transmission mechanism 86 is disposed between the motor shaft 85 of the starter motor 84 and the crankshaft 40 as shown in FIG. 4.

Effects of the first embodiment of the present invention will be described below. The water jackets 50A and 51 are formed, respectively, in the cylinder body 41 and the cylinder head 42 that constitute the cylinder section 38 of the engine main unit 34 such that coolant flows through the cylinder body 41 and the cylinder head 42 independently of each other. The thermostat 74 is mounted on the front wall surface of the cylinder section 38, the thermostat 74 being capable of selecting a condition in which the water jacket 50A in the cylinder body 41 and the water jacket 51 in the cylinder head 42 directly communicate with each other or a condition in which the water jacket 50A in the cylinder body 41 and the water jacket 51 in the cylinder head 42 communicate with each other via the radiator 52 disposed forwardly of the engine main unit 34. Piping connecting the thermostat 74 and the radiator 52 can therefore be routed on a side adjacent the center in the vehicle width direction in a space between the cylinder section 38 and the radiator 52 disposed forwardly of the cylinder section 38, which improves appearance.

The water pump 54 is disposed rearwardly of the cylinder section 38 so as to sandwich the cylinder section 38 between the water pump 54 and the radiator 52 in the longitudinal direction. The water pump 54 has the discharge port 65 connected to the water jacket 51 in the cylinder head 42 and the suction port 71 connected to the water jacket 50A in the cylinder body 41. The foregoing arrangements allow the water pump 54 to be disposed as close as possible to the water jackets 50A and 51 to thereby achieve shorter piping length.

The connecting path 76 communicating with the water jacket 51 in the cylinder head 42 and the connecting paths 77, 77 communicating with the water jacket 50A in the cylinder body 41 are respectively formed at the front portion of the cylinder body 41. The thermostat 74 is mounted on the front wall surface of one of the cylinder body 41 and the cylinder head 42 so as to select a condition in which the connecting paths 76 and 77, 77 are in communication with each other or a condition in which the connecting paths 76 and 77, 77 are in communication with each other via the radiator 52. This simplifies a path structure, while shortening a path length between the water jackets 50A and 51, and the thermostat 74.

The connecting paths 76 and 77, 77 are formed to be open in the front wall surface of the cylinder body 41 so as to be adjacent to each other. The thermostat case 75 that houses therein the thermostat 74 is mounted on the front wall surface of the cylinder body 41 so as to cover the open ends of the connecting paths 76 and 77, 77. This simplifies a connecting structure between the thermostat 74 and the connecting paths 76 and 77, 77.

The thermostat 74 is mounted at a central portion of the cylinder section 38 in a direction extending along the axis of the crankshaft 40. This makes the length of a line that extracts coolant from the thermostat 74 to the radiator 52 equal to that of a line that returns the coolant from the radiator 52 to the thermostat 74 and keeps these lengths short.

The thermostat case 75 includes the extracting pipe section 75a for extracting coolant to the side of the radiator 52 and the introducing pipe section 75b for introducing coolant returned from the radiator 52. The extracting pipe section 75a and the introducing pipe section 75h are disposed so as to protrude in directions opposite to each other in the vehicle width direction. This allows lines extended from the thermostat case 75 to be connected to connecting ports on both sides in the vehicle width direction of the radiator 52 over a shortest possible distance.

The operating axis direction 80 of the thermostat 74 is set to extend in a direction of the cylinder axis C of the cylinder section 38. This shortens the length of the thermostat 74 in the vehicle width direction, prevents the thermostat 74 from protruding sideways from the engine main unit in an internal combustion engine having a small number of cylinders, and prevents the internal combustion engine from becoming wide in the vehicle width direction.

Figure 8:
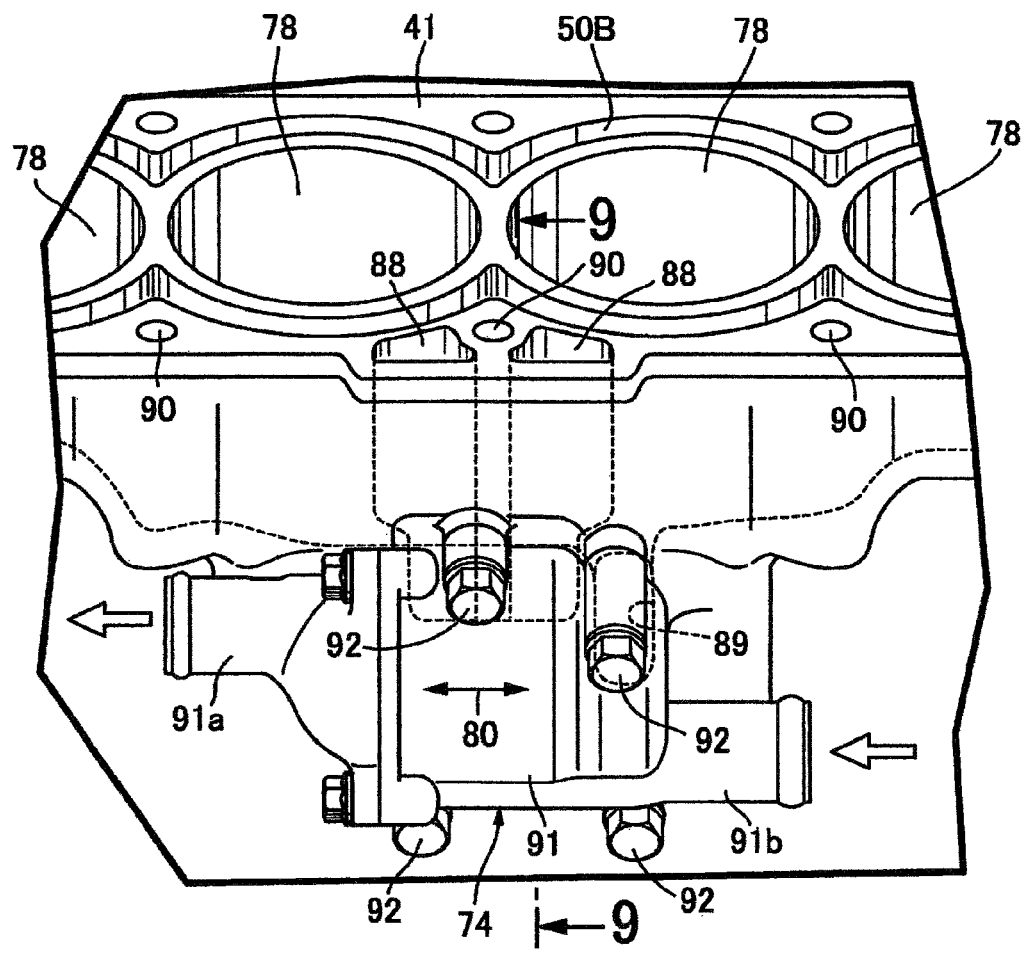
FIG. 8 is a view showing a second embodiment of the present invention, corresponding to FIG. 6.
Figure 9:
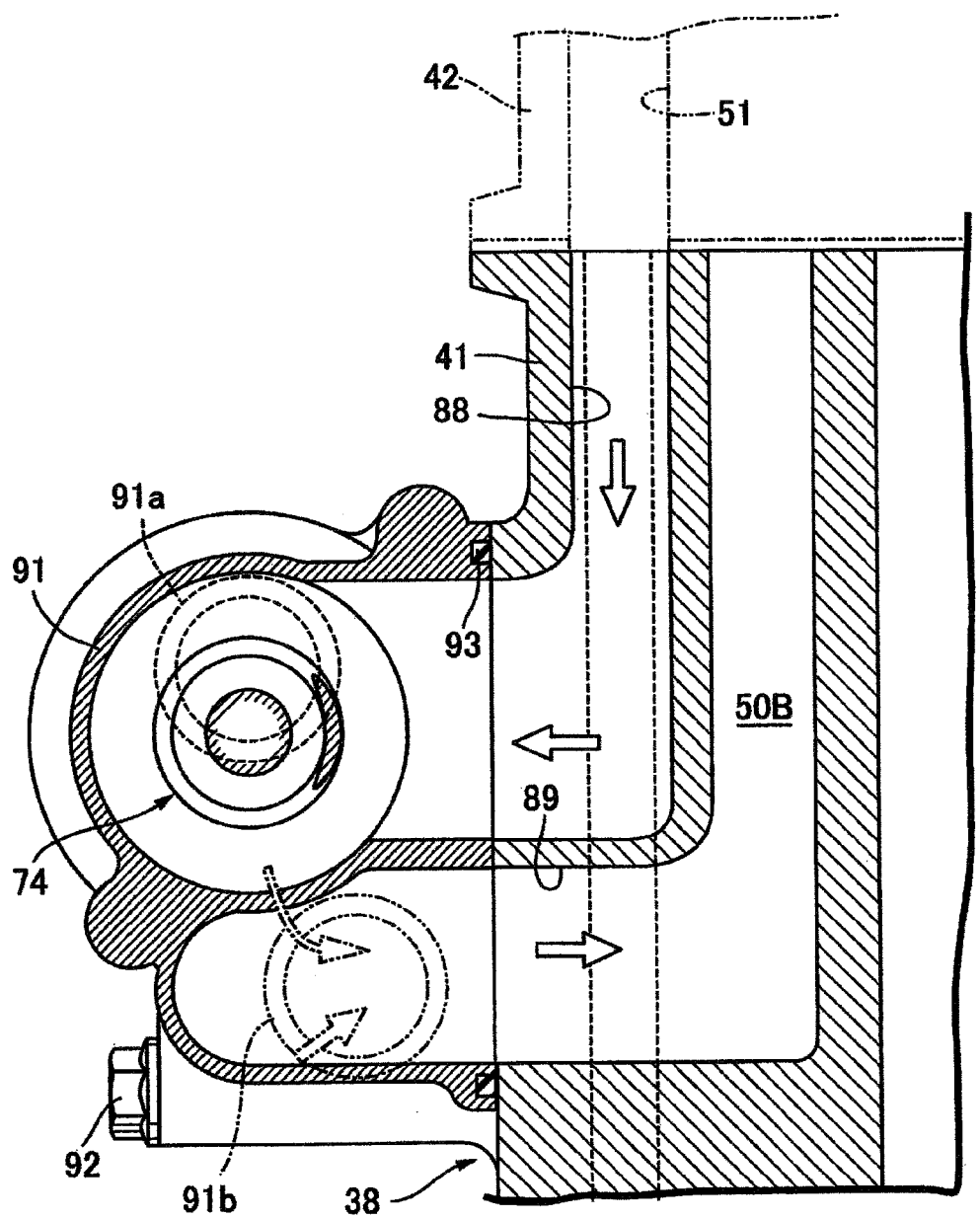
FIG. 9 is a cross-sectional view taken along line 9-9 of FIG. 8.

A cooling system structure according to a second embodiment of the present invention will be described below with reference to FIGS. 8 to 9. Like or corresponding parts are identified by the same reference numerals as those used for the first embodiment of the present invention and detailed descriptions for those parts will be omitted.

A thermostat 74 is mounted on a front wall surface of a cylinder section 38 at a central portion in the vehicle width direction, the thermostat 74 being capable of selecting a condition in which a water jacket 50B in a cylinder body 41 and a water jacket 51 in a cylinder head 42 directly communicate with each other or a condition in which the water jacket 50B in the cylinder body 41 and the water jacket 51 in the cylinder head 42 communicate with each other via a radiator 52.

Connecting paths 88, 88 and a connecting path 89 are formed in a front portion of one of the cylinder body 41 and the cylinder head 42, specifically according to the second embodiment of the present invention, the cylinder body 41. The connecting paths 88, 88 and the connecting path 89 communicate with the other of the cylinder body 41 and the cylinder head 42, specifically according to the second embodiment of the present invention, the water jacket 51 in the cylinder head 42 and the water jacket 50B in the cylinder body 41, respectively. The thermostat 74 is mounted on the front wall surface of the cylinder body 41 so as to select a condition in which the connecting paths 88, 88 and 89 are in communication with each other or a condition in which the connecting paths 88, 88 and 89 are in communication with each other via the radiator 52.

The water jacket 50B in the cylinder body 41 is formed so as to surround a whole of four cylinder bores 78, 78, the cylinder bores 78, 78 being arranged in juxtaposition in the cylinder body 41. The connecting paths 88, 88 formed in the cylinder body 41 to communicate with the water jacket 51 in the cylinder head 42 are disposed forwardly of the water jacket 50B at a central portion in a direction in which the cylinder bores 78, 78 are arranged. The connecting paths 88, 88 are formed so as to extend vertically at positions at which the connecting paths 88, 88 sandwich one of a plurality of bolt inserting holes 90, 90 through which bolts for fastening the cylinder head 42 to the side of the cylinder body 41 are to be passed.

The connecting path 89 communicating with the water jacket 50B is open in the front wall surface of the cylinder body 41 so as to communicate with a lower portion of the water jacket 50B. The connecting paths 88, 88 formed in the cylinder body 41 to communicate with the water jacket 51 in the cylinder head 42 are also open in the front wall surface of the cylinder body 41 at a position adjacent to the connecting path 89.

The thermostat 74 is housed in a thermostat case 91 such that an operating axis direction 80 thereof extends in a direction of an axis of a crankshaft 40 (in the vehicle width direction). The thermostat case 91 is fastened to the front wall surface of the cylinder body 41 with a plurality of bolts 92, 92 so as to cover open ends of the connecting paths 88, 88 and 89. A sealing member 93 is inserted between the thermostat case 91 and the cylinder body 41.

The thermostat case 91 includes an extracting pipe section 91a and an introducing pipe section 91b. The extracting pipe section 91a extracts coolant to the side of the radiator 52. The introducing pipe section 91b introduces coolant returned from the radiator 52. The extracting pipe section 91a and the introducing pipe section 91b are disposed so as to protrude in directions opposite to each other in the vehicle width direction.

In the second embodiment of the present invention, the thermostat 74 disposed on the front wall surface of the cylinder body 41 has the operating axis direction 80 that extends in the direction of the axis of the crankshaft 40. This shortens a vertical length of the thermostat 74, so that interference between the thermostat 74 and the cylinder head 42 can be easily avoided.

Figure 10:
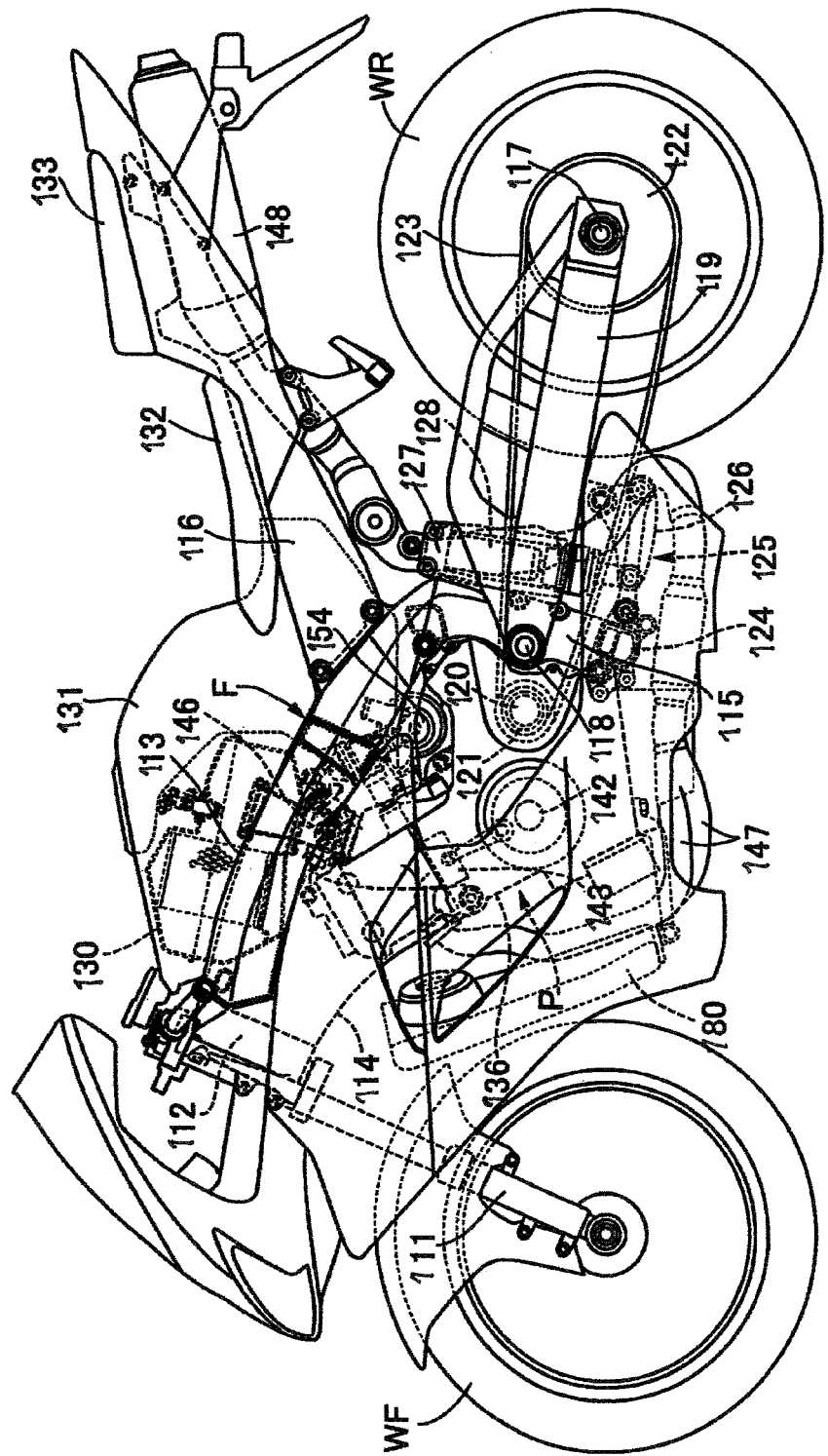
FIG. 10 is a left side elevational view showing a motorcycle.

Referring to FIG. 10, a motorcycle as a small sized vehicle includes a vehicle body frame F. The vehicle body frame F includes a head pipe 112, a pair of left and right main frames 113, a pair of left and right engine hangers 114, a pair of left and right pivot frames 115, and a pair of left and right seat rails 116. More specifically, the head pipe 112 steerably supports a front fork 111 that journals a front wheel WF. The main frames 113 extend downwardly toward the rear from the head pipe 112. The engine hangers 114 are connected to the head pipe 112 and front portions of the main frames 113 and extend downwardly toward the rear under the main frames 113. The pivot frames 115 are connected to rear end portions of the main frames 113 and extend downwardly. The seat rails 116 extend upwardly toward the rear and are connected to rear portions of the main frames 113.

A power unit P is mounted on the vehicle body frame F so as to be disposed downwardly of the main frames 113. An axle 117 of a rear wheel WR that is rotatably driven by power output from the power unit P is journaled by a rear end portion of a swing arm 119 that has a front end portion vertically swingably supported on the pivot frames 115 via a pivot 118. In addition, an endless chain 123 is wound around a drive sprocket 121 fixed to an output shaft 120 of the power unit P and a driven sprocket 122 fixed to the axle 117.

A linkage mechanism 125 is disposed between a cross pipe 124 that connects lower portions of the pivot frames 115 and the swing arm 119. A rear shock absorber unit 128 is disposed between a linkage member 126 that forms part of the linkage mechanism 125 and a bracket 127 disposed at a front portion of the swing arm 119.

An air cleaner 130 is disposed upwardly of the power unit P so as to be positioned rearwardly of the head pipe 112 in the vehicle body frame F. A fuel tank 131 that covers a rear portion and an upper portion of the air cleaner 130 is mounted on the main frames 113 in the vehicle body frame F. A main seat 132 on which a rider sits is supported on the seat rails 116 at a position rearward of the fuel tank 131. A pillion seat 133 on which a passenger sits is supported on the seat rails 116 at a position away rearwardly from the main seat 132.

Figure 11:
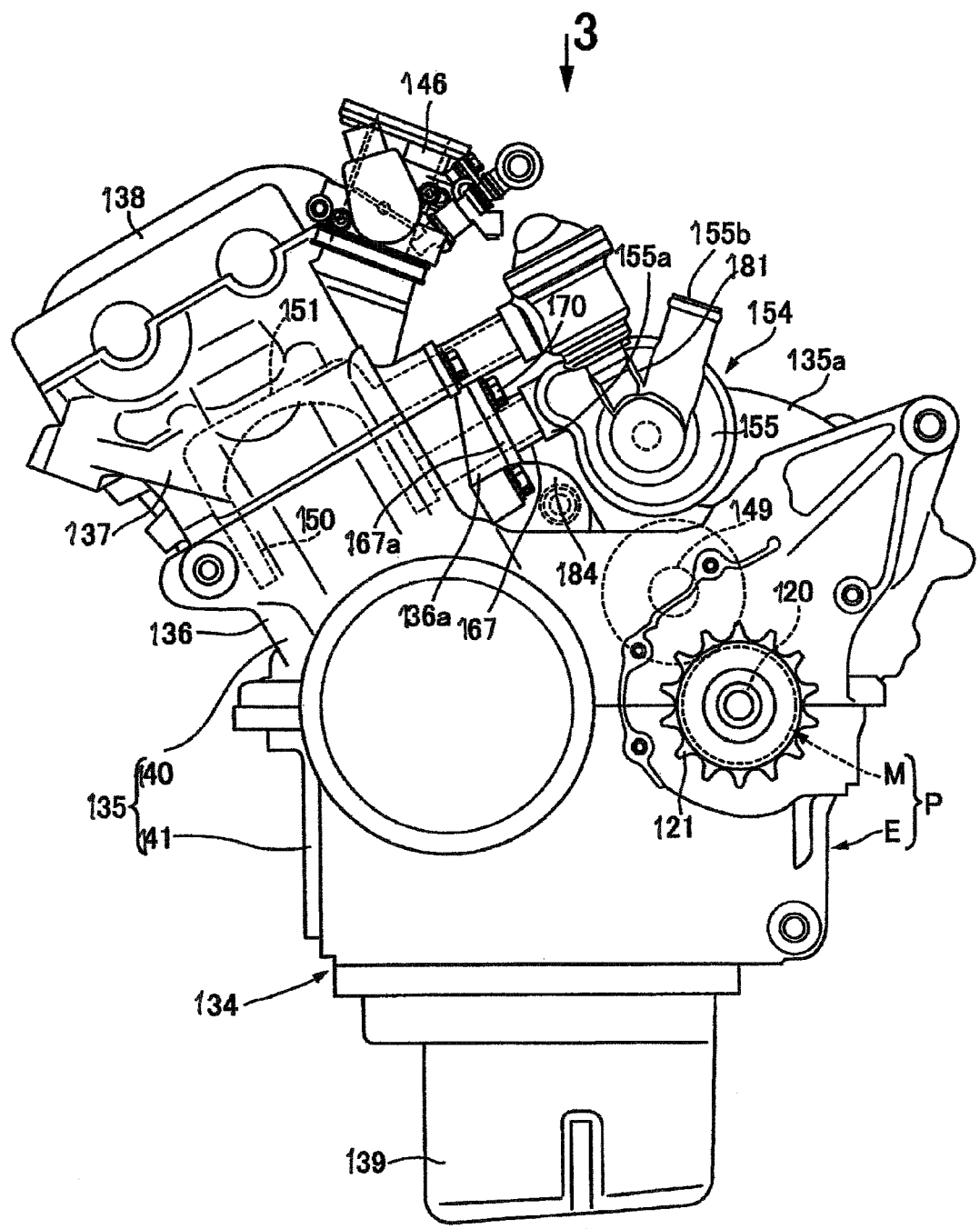
FIG. 11 is a left side elevational view showing a power unit as viewed from an arrow 2 in FIG. 12.
Figure 12:
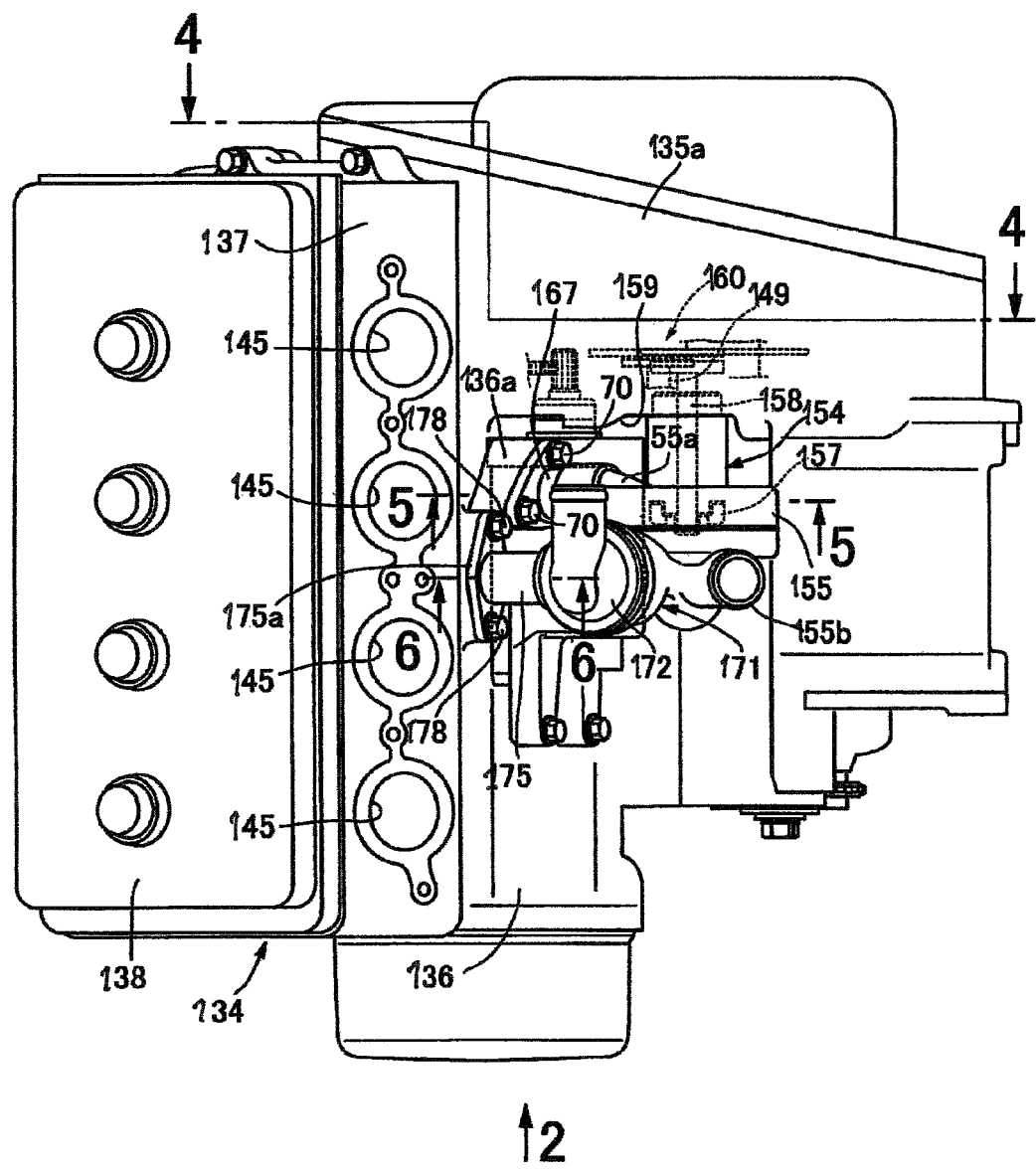
FIG. 12 is a view on arrow 3 of FIG. 11.
Figure 13:
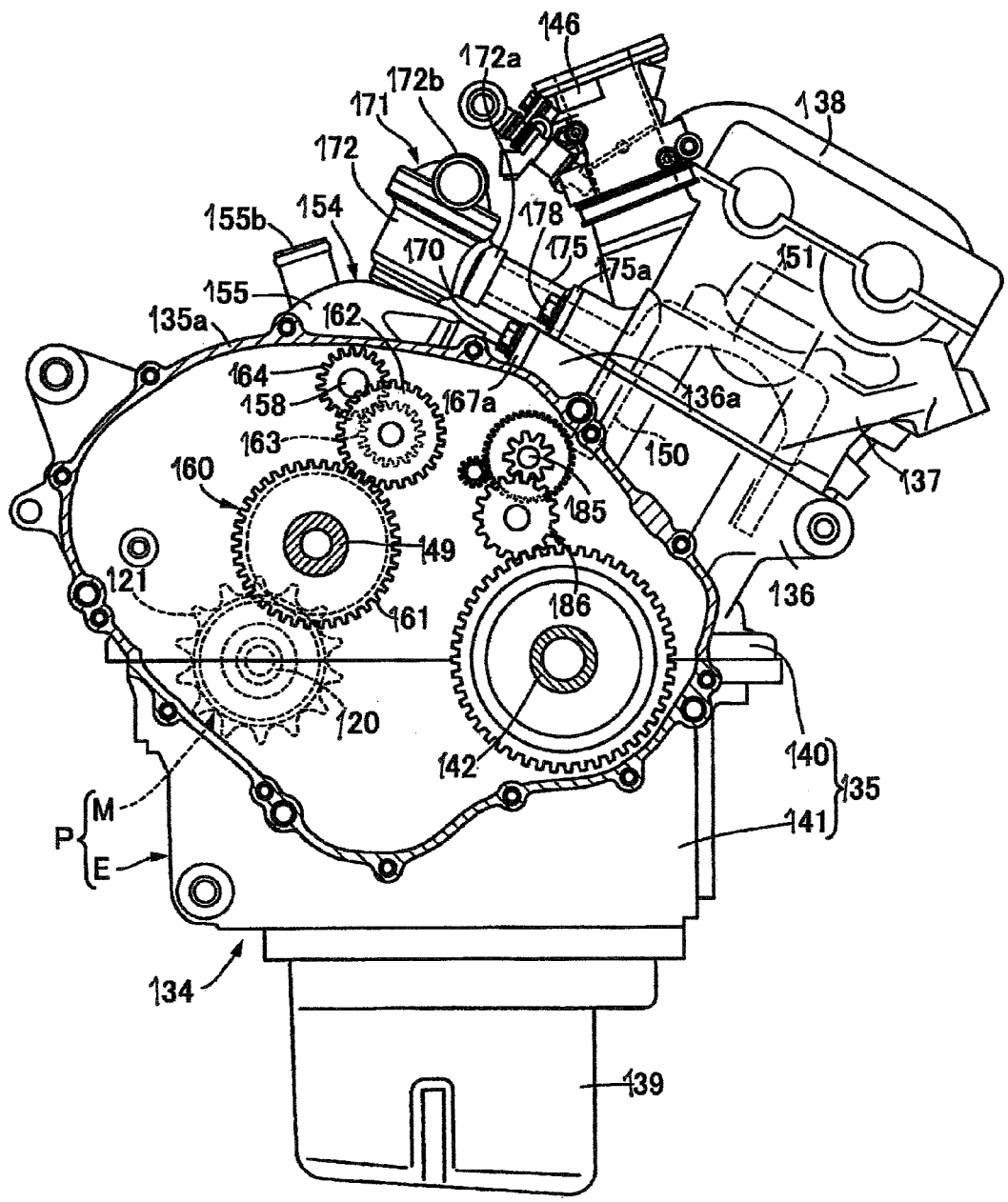
FIG. 13 is a cross-sectional view taken along line 4-4 of FIG. 12.

Referring also to FIGS. 11 to 13, the power unit P includes, for example, a four-cylinder internal combustion engine E and a gear transmission M having the output shaft 120 and built into an engine main unit 134 of the internal combustion engine E.

The engine main unit 134 includes a crankcase 135, a cylinder body 136, a cylinder head 137, and a head cover 138. More specifically, the crankcase 135 rotatably supports a crankshaft 142 that has an axis extending in a vehicle width direction. The cylinder body 136 rises upwardly from a front portion of the crankcase 135 in a position obliquely inclined to the front. The cylinder head 137 is connected to an upper end portion of the cylinder body 136. The head cover 138 is connected to the cylinder head 137. An oil pan 139 is connected to a lower portion of the crankcase 135.

The crankcase 135 includes an upper portion case half body 140 and a lower portion case half body 141 mutually connected together. The cylinder body 136 is integrated with the upper portion case half body 140. The cylinder body 136 includes pistons 143 (see FIG. 10) that are slidably fitted in respective cylinders juxtaposed in the vehicle width direction, each of the pistons 143 being commonly connected to the crankshaft 142 as shown in FIG. 10.

An intake port 145 (see FIG. 12) for each of the cylinders is open in a rear portion side surface of the cylinder head 137. Each of the intake ports 145 is connected to the air cleaner 130 via a throttle body 146 of each of the cylinders. An exhaust pipe 147 of each cylinder has an upstream end connected to a front portion side surface of the cylinder head 137 and a downstream end connected to an exhaust muffler 148 disposed upwardly of the rear wheel WR.

The gear transmission M includes a main shaft 149 and a gear train. More specifically, the main shaft 149 assumes a transmission shaft that is rotatably supported by the crankcase 135 so as to receive rotational power transmitted from the crankshaft 142. The gear train is capable of selectively establishing a plurality of shift speeds with the output shaft 120 that assumes a countershaft rotatably supported by the crankcase 135. The gear transmission M is disposed rearwardly of the crankshaft 142. In addition, the crankcase 135 includes a transmission housing section 135a formed so as to house therein the gear transmission M. The transmission housing section 135a is disposed rearwardly of the cylinder body 136.

A cylinder body side water jacket 150 is formed inside the cylinder body 136. A cylinder head side water jacket 151 that joins to the cylinder body side water jacket 150 is formed inside the cylinder head 137.

A water pump 154 supplies the cylinder body side water jacket 150 with coolant. The water pump 154 is disposed rearwardly of the cylinder body 136 and upwardly of the transmission housing section 135a.

Figure 14:
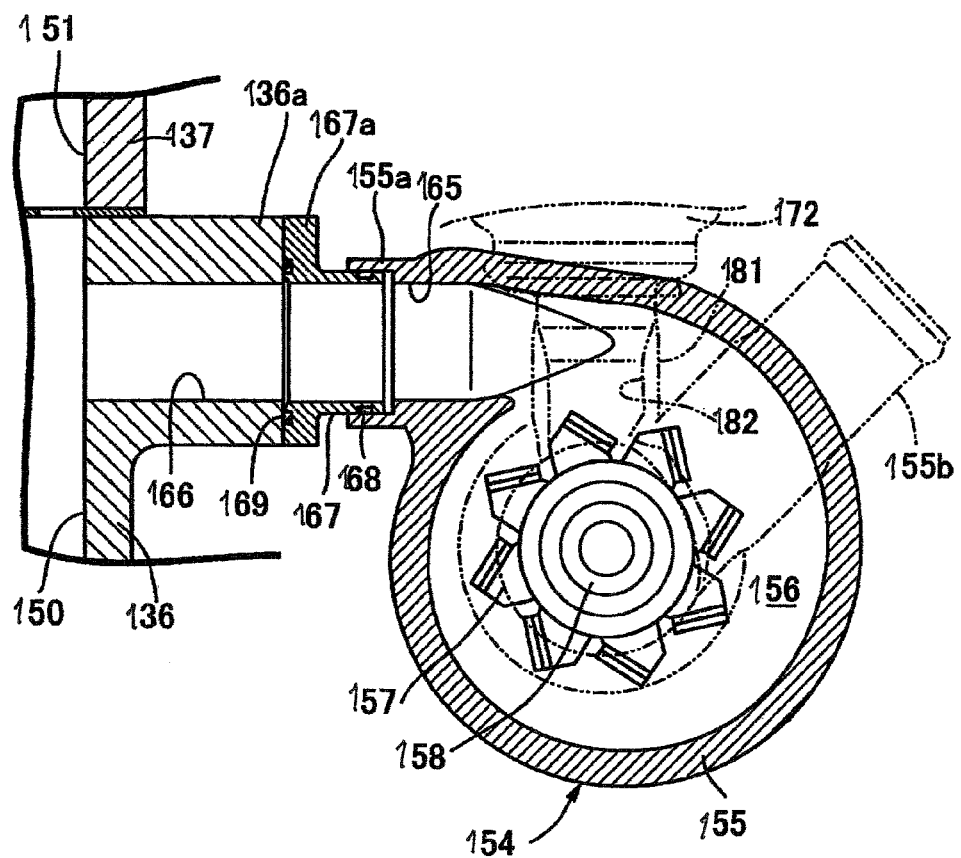
FIG. 14 is a cross-sectional view taken along line 5-5 of FIG. 12.

Referring also to FIG. 14, the water pump 154 includes a pump housing 155, a pump chamber 156, an impeller 157, and a pump shaft 158. More specifically, the impeller 157 is housed in the pump chamber 156 formed inside the pump housing 155. The impeller 157 is mounted on the pump shaft 158 that is rotatably supported by the pump housing 155.

The transmission housing section 135a in the crankcase 135 has a recessed portion 159 indented downwardly and formed in an upper surface thereof. The water pump 154 is disposed rearwardly of the cylinder body 136 such that part of the water pump 154 is disposed inside the recessed portion 159.

As explicitly shown in FIG. 13, a power transmission mechanism 160 is disposed between a main shaft 149 of the gear transmission M and the pump shaft 158 of the water pump 154. The power transmission mechanism 160 includes a drive gear 161, a first intermediate gear 162, a second intermediate gear 163, and a driven gear 164. More specifically, the drive gear 161 is fixed to the main shaft 149. The first intermediate gear 162 meshes with the drive gear 161. The second intermediate gear 163 rotates integrally with the first intermediate gear 162. The driven gear 164 is fixed to the pump shaft 158 and meshes with the second intermediate gear 163.

The pump housing 155 of the water pump 154 includes a discharge pipe section 155a formed integrally to face the side of the cylinder body 136. The discharge pipe section 155a forms a discharge port 165 that communicates with the pump chamber 156. Meanwhile, the cylinder body 136 has a connecting pipe section 136a integrated with a rear portion side surface thereof in a condition protruding toward the side of the water pump 154. The connecting pipe section 136a forms an inflow port 166 that communicates with the cylinder body side water jacket 150. The pump housing 155 is mounted on the cylinder body 136 via a first rigid conduit 167 such that the discharge port 165 communicates with the inflow port 166.

The first rigid conduit 167 is formed of a rigid material connecting linearly the discharge port 165 and the inflow port 166. The first rigid conduit 167 has a first end portion fitted in one of the pump housing 155 and the cylinder body 136 fluid-tightly via a first annular sealing member 168 and a second end portion fastened to the other of the pump housing 155 and the cylinder body 136 fluid-tightly via a second annular sealing member 169. In the preferred embodiment of the present invention, therefore, the first rigid conduit 167 has the first end portion fitted in the discharge pipe section 155a of the pump housing 155 fluid-tightly via the first annular sealing member 168 and a flange portion 167a disposed on the second end portion of the first rigid conduit 167 is fastened fluid-tightly with a plurality of bolts 170, 170 to the connecting pipe section 136a of the cylinder body 136 via the second annular sealing member 169.

Figure 15:
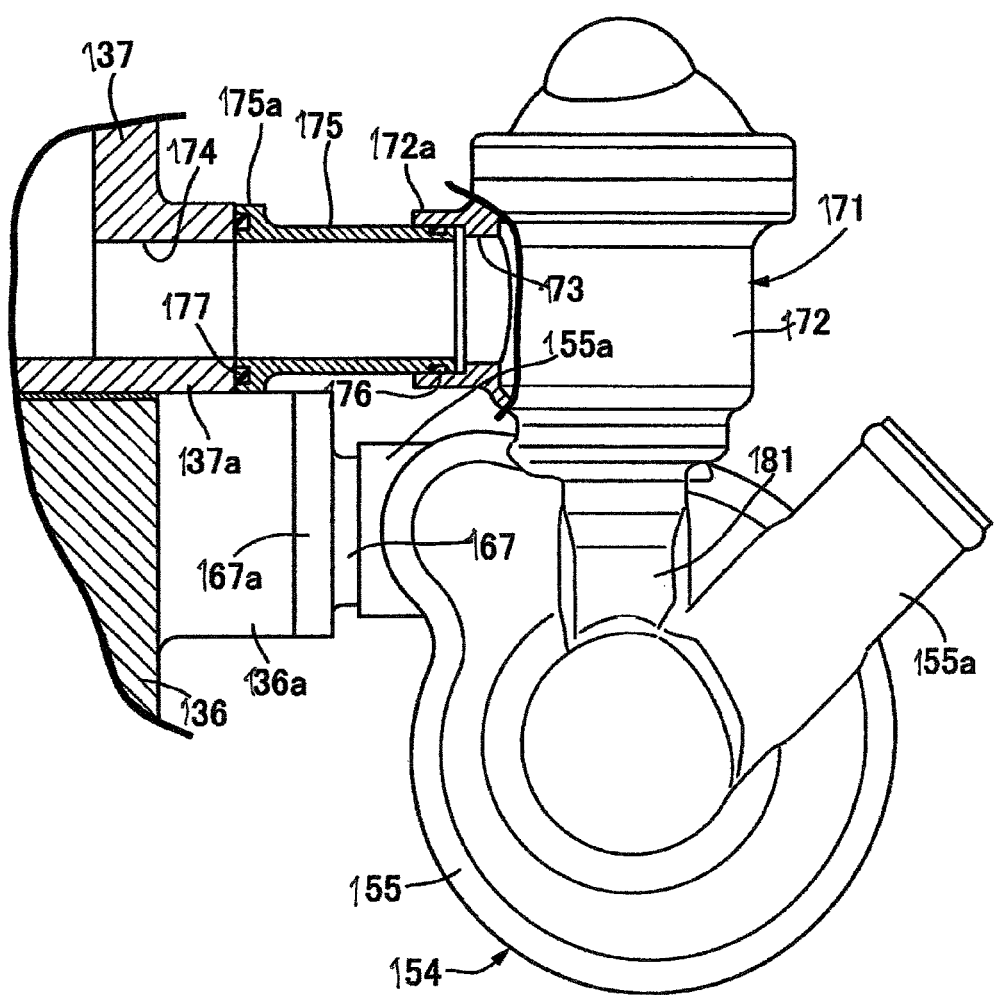
FIG. 15 is a cross-sectional view taken along line 6-6 of FIG. 12.

Referring also to FIG. 15, a thermostat case 172 of a thermostat 171 communicating with the cylinder head side water jacket 151 is disposed rearwardly of the cylinder head 137. The thermostat case 172 includes an inflow pipe section 172a that forms an inflow port 173 integrally formed to face the side of the cylinder head 137. A connecting pipe section 137a that forms an outflow port 174 communicating with the cylinder head side water jacket 151 is formed in a protruding condition integrally at the rear portion side surface of the cylinder head 137 to face the side of the thermostat case 172. The thermostat case 172 is mounted on the cylinder head 137 via a second rigid conduit 175 such that the outflow port 174 communicates with the inflow port 173.

Similarly to the first rigid conduit 167, the second rigid conduit 175 is formed of a rigid material connecting linearly the outflow port 174 and the inflow port 173. The second rigid conduit 175 has a first end portion fitted in the inflow pipe section 172a of the thermostat case 172 fluid-tightly via a third annular sealing member 176. A flange portion 175a disposed on a second end portion of the second rigid conduit 175 is fastened fluid-tightly with a plurality of bolts 178, 178 to the connecting pipe section 137a of the cylinder head 137 via a fourth annular sealing member 177.

Referring to FIG. 10, a radiator 180 is disposed forwardly of the cylinder body 136 of the internal combustion engine E so as to sandwich the cylinder body 136 between the radiator 180 and the water pump 154. The thermostat 171 controls an amount of coolant distributed to the radiator 180 and the water pump 154 according to a temperature of the coolant as follows. More specifically, as the temperature of coolant flowing out from the cylinder head side water jacket 151 increases, an amount of coolant flowing to the radiator 180 from a connecting pipe section 172b disposed at the thermostat case 172 is increased, while an amount of coolant flowing to the water pump 154 is decreased.

The water pump 154 is disposed immediately beneath the thermostat case 172 and the thermostat case 172 is integrated with the pump housing 155. More specifically, the thermostat case 172 and the pump housing 155 are integrated with each other via a path section 181 that forms a bypass path 182 for circumventing the radiator 80 and guiding coolant from the thermostat 171 to the pump chamber 156 of the water pump 154.

In addition, a return line section 155b for guiding coolant returned from the radiator 180 to the pump chamber 156 is integrated with the pump housing 155 of the water pump 154.

As explicitly shown in FIG. 11, a starter motor 184 is disposed downwardly of the water pump 154. The starter motor 184 is disposed on an upper wall of the transmission housing section 135a such that a motor shaft 185 thereof extends in parallel with the crankshaft 142. A gear type power transmission mechanism 186 is disposed between the motor shaft 185 of the starter motor 184 and the crankshaft 142 as shown in FIG. 13.

Effects of a preferred embodiment of the present invention will be described below. The crankcase 135 includes the transmission housing section 135a formed therein. The transmission housing section 135a housing the gear transmission M disposed rearwardly of the crankshaft 142 is formed so as to be disposed rearwardly of the cylinder body 136. The water pump 154 for circulating coolant through the cylinder body side water jacket 150 formed in the cylinder body 136 is disposed rearwardly of the cylinder body 136 and upwardly of the transmission housing section 135a. The water pump 154 is thereby disposed close to the cylinder body side water jacket 150, so that a piping length between the cylinder body side water jacket 150 and the water pump 154 can be shortened. In addition, the water pump 154, being disposed rearwardly of the cylinder body 136, does not protrude sideways from the cylinder body 136 in the vehicle width direction. A distance from the crankshaft 142 that develops power for driving the water pump 154 can also be shortened to thereby achieve a compact power unit P.

The transmission housing section 135a has the recessed portion 159 indented downwardly and formed in the upper surface thereof and part of the water pump 154 is disposed in the recessed portion 159. The water pump 154 is thus disposed at a low level, so that reduction in size and a lower center of gravity of the power unit P can be achieved.

The gear transmission M includes the main shaft 149 that is rotatably supported by the crankcase 135 such that power is transmitted from the crankshaft 142. The power transmission mechanism 160 is disposed between the main shaft 149 and the pump shaft 158 of the water pump 154. The power transmission mechanism 160 can be built compactly such that power is transmitted to the pump shaft 158 from the main shaft 149 that is disposed closer to the water pump 154 relative to the crankshaft 142.

The pump housing 155 is mounted on the cylinder body 136 such that the discharge port 165 disposed in the pump housing 155 of the water pump 154 communicates with the inflow port 166 disposed in the cylinder body 136 so as to be in communication with the cylinder body side water jacket 150. Mounting stiffness of the water pump 154 can thereby be enhanced.

The first rigid conduit 167 connecting the discharge port 165 and the inflow port 166 has a first end portion fitted in the pump housing 155 fluid-tightly via the first annular sealing member 168 and a second end portion fastened to the cylinder body 136 fluid-tightly via the second annular sealing member 169. The pump housing 155 can thus be connected to the cylinder body 136 in a fluid-tight condition, while permitting deviation in positions occurring during assembly due to variations in forming accuracy.

The thermostat case 172 of the thermostat 171 communicating with the cylinder head side water jacket 151 formed in the cylinder head 137 so as to join to the cylinder body side water jacket 150 is connected to the cylinder head 137 and the water pump 154 is disposed immediately beneath the thermostat case 172. A dead space otherwise created downwardly of the thermostat 171 when the thermostat 171 is disposed can be effectively used for disposing the water pump 154, which contributes to reduction in size of the power unit P.

The thermostat case 172 and the pump housing 155 of the water pump 154 are integrally formed with each other. This prevents the number of parts from increasing as a result of disposing the thermostat 171.

In addition, the radiator 80 is disposed forwardly of the cylinder body 136 so as to sandwich the cylinder body 136 between the radiator 180 and the water pump 154. Disposing the radiator 180 and the water pump 154 across the cylinder body 136 in the longitudinal direction allows the radiator 180 and the water pump 154 to be disposed compactly close to the cylinder body 136, while avoiding interference among the radiator 180, the cylinder body 136, and the water pump 154.

While the exemplary preferred embodiment of the present invention has been described, it is to be understood that the above-described embodiment is not intended to limit the present invention and various changes in form and detail may be made therein without departing from the spirit and scope of the invention.

For example, the present invention may be applied widely to small sized vehicles including three-wheeled vehicles, in addition to the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A cooling system structure for a vehicular water-cooled internal combustion engine, comprising:
   a cylinder section constituting, together with a crankcase for rotatably supporting a crankshaft, an engine main unit, said cylinder section includes a cylinder body that projects upwardly from the crankcase, a piston operatively connected to the crankshaft is slidably fitted within the cylinder body and a cylinder head is connected to the cylinder body;
   water jackets are formed in the cylinder body and the cylinder head, respectively;

a radiator is disposed forwardly of the engine main unit;

a water pump is disposed on the engine main unit, the water pump circulates coolant through the radiator and the water jackets, the cooling system structure for a vehicular water-cooled internal combustion engine;

said water jackets are respectively formed so as to allow coolant to flow through the cylinder body and the cylinder head independently of each other; and a thermostat is disposed on a front wall surface of the cylinder section, the thermostat being capable of selecting a condition in which the water jacket in the cylinder body and the water jacket in the cylinder head directly communicate with each other or a condition in which the water jacket in the cylinder body and the water jacket in the cylinder head communicate with each other via the radiator, wherein the coolant flow is circulated from the inlet port of the cylinder head, at the outer side wall, to the outlet port of the cylinder body.

2. The cooling system structure for a vehicular water-cooled internal combustion engine according to claim 1, wherein the water pump is disposed rearwardly of the cylinder section so as to sandwich the cylinder section between the water pump and the radiator in a longitudinal direction, and the water pump includes a discharge port connected to one of the water jacket in the cylinder body and the water jacket in the cylinder head and a suction port connected to the other of the water jacket in the cylinder body and the water jacket in the cylinder head.

3. The cooling system structure for a vehicular water-cooled internal combustion engine according to claim 1, wherein a first connecting path and a second connecting path are formed at a front portion of one of the cylinder body and the cylinder head, respectively, the first connecting path communicating with the water jacket in the other of the cylinder body and the cylinder head, and the second connecting path communicating with the water jacket in the one of the cylinder body and the cylinder head, and the thermostat is disposed on the front wall surface of the one of the cylinder body and the cylinder head so as to select a condition in which the first and second connecting paths are in communication with each other or a condition in which the first and second connecting paths are in communication with each other via the radiator.

4. The cooling system structure for a vehicular water-cooled internal combustion engine according to claim 3, wherein the first and second connecting paths are formed to be open in the front wall surface of the cylinder body so as to be adjacent to each other, and a thermostat case is disposed on the front wall surface of the cylinder body so as to cover open ends of the first and second connecting paths, the thermostat case housing therein the thermostat.

5. The cooling system structure for a vehicular water-cooled internal combustion engine according to claim 1, wherein the thermostat is disposed at a central portion of the cylinder section in a direction extending along an axis of the crankshaft.

6. The cooling system structure for a vehicular water-cooled internal combustion engine according to claim 2, wherein the thermostat is disposed at a central portion of the cylinder section in a direction extending along an axis of the crankshaft.

7. The cooling system structure for a vehicular water-cooled internal combustion engine according to claim 4, wherein the thermostat case that houses therein the thermostat includes an extracting pipe section for extracting coolant to a side of the radiator and an introducing pipe section for introducing coolant returned from the radiator, the extracting pipe section and the introducing pipe section being disposed so as to protrude in directions opposite to each other in a vehicle width direction.

8. The cooling system structure for a vehicular water-cooled internal combustion engine according to claim 1, wherein the thermostat has an operating axis direction set to extend in a direction of a cylinder axis of the cylinder section.

9. The cooling system structure for a vehicular water-cooled internal combustion engine according to claim 2, wherein the thermostat has an operating axis direction set to extend in a direction of a cylinder axis of the cylinder section.

10. The cooling system structure for a vehicular water-cooled internal combustion engine according to claim 4, wherein the operating axis direction of the thermostat is set to extend in a direction of the axis of the crankshaft.

11. A cooling system structure in a power unit for use in a small sized vehicle, the power unit being disposed on a vehicle body frame and comprising:

an internal combustion engine including:

a crankcase rotatably supporting a crankshaft having an axis extending in a vehicle width direction; and a cylinder body wherein a piston operatively connected to the crankshaft is slidably fitted within the cylinder body, said cylinder body rises upwardly from a front portion of the crankcase, the cylinder body includes a water jacket formed therein for circulating coolant;

a transmission disposed rearwardly of the crankshaft and housed in a transmission housing section formed in the crankcase rearwardly of the cylinder body, and a water pump disposed rearwardly of the cylinder body and upwardly of the transmission housing section, said water pump circulating the coolant through the water jacket in the cylinder body, wherein the coolant flow is circulated from the inlet port of the cylinder head, at the outer side wall, to the outlet port of the cylinder body.

12. The cooling system structure in a power unit for use in a small sized vehicle according to claim 11, wherein the transmission housing section has a recessed portion indented downwardly and formed in an upper surface thereof, and part of the water pump is disposed in the recessed portion.

13. The cooling system structure in a power unit for use in a small sized vehicle according to claim 11, wherein the transmission includes a transmission shaft rotatably supported by the crankcase such that power is transmitted from the crankshaft, and a power transmission mechanism disposed between the transmission shaft and a pump shaft of the water pump.

14. The cooling system structure in a power unit for use in a small sized vehicle according to claim 11, wherein a pump housing included in the water pump is disposed on the cylinder body wherein a discharge port disposed in the pump housing communicates with an inflow port disposed in the cylinder body to be in communication with the water jacket.

15. The cooling system structure in a power unit for use in a small sized vehicle according to claim 12, wherein
a pump housing included in the water pump is disposed on the cylinder body wherein a discharge port disposed in the pump housing communicates with an inflow port disposed in the cylinder body to be in communication with the water jacket.

16. The cooling system structure in a power unit for use in a small sized vehicle according to claim 14, wherein
a rigid conduit connecting the discharge port and the inflow port has a first end portion fitted in one of the pump housing and the cylinder body fluid-tightly via a first annular sealing member and a second end portion fastened to the other of the pump housing and the cylinder body fluid-tightly via a second annular sealing member.

17. The cooling system structure in a power unit for use in a small sized vehicle according to claim 11, wherein
a cylinder head having a cylinder head side water jacket that joins to the water jacket in the cylinder body is connected to an upper end portion of the cylinder body,
a thermostat case of a thermostat communicating with the cylinder head side water jacket is connected to the cylinder head, and
the water pump is disposed immediately beneath the thermostat case.

18. The cooling system structure in a power unit for use in a small sized vehicle according to claim 17, wherein the thermostat case is integrally formed with the pump housing of the water pump.

19. The cooling system structure in a power unit for use in a small sized vehicle according to claim 11, wherein a radiator is disposed forwardly of the cylinder body so as to sandwich the cylinder body between the radiator and the water pump.

20. The cooling system structure in a power unit for use in a small sized vehicle according to claim 12, wherein a radiator is disposed forwardly of the cylinder body so as to sandwich the cylinder body between the radiator and the water pump.

* * * * *